United States Patent
Huang et al.

(10) Patent No.: US 8,872,806 B2
(45) Date of Patent: Oct. 28, 2014

(54) DIRECTION INDICATING DEVICE

(75) Inventors: Hung-Ming Huang, Taipei Hsien (TW);
Lin Lee, Taipei Hsien (TW)

(73) Assignee: Wistron Corporation, Hsichih, New Taipei (TW)

( * ) Notice: Subject to any disclaimer, the term of this patent is extended or adjusted under 35 U.S.C. 154(b) by 1031 days.

(21) Appl. No.: 12/882,220

(22) Filed: Sep. 15, 2010

(65) Prior Publication Data

US 2011/0102380 A1    May 5, 2011

(30) Foreign Application Priority Data

Nov. 5, 2009 (TW) .............................. 98137577 A

(51) Int. Cl.
*G06F 3/033* (2013.01)
*G06F 3/0338* (2013.01)

(52) U.S. Cl.
CPC .................................. *G06F 3/0338* (2013.01)
USPC ........... 345/184; 345/161; 345/169; 338/128; 338/118; 338/123; 338/133

(58) Field of Classification Search
None
See application file for complete search history.

(56) References Cited

U.S. PATENT DOCUMENTS

| | | | | |
|---|---|---|---|---|
| 3,701,963 A | * | 10/1972 | Kasazima | 338/128 |
| 3,788,649 A | * | 1/1974 | Hirano | 381/19 |
| 4,782,327 A | * | 11/1988 | Kley et al. | 341/2 |
| 6,075,522 A | * | 6/2000 | Milroy | 345/184 |
| 6,753,848 B2 | | 6/2004 | Toshiharu | |
| 7,310,083 B2 | * | 12/2007 | Hagiwara et al. | 345/156 |

FOREIGN PATENT DOCUMENTS

| | | |
|---|---|---|
| CN | 1362715 A | 8/2002 |
| TW | 435763 | 5/2001 |

OTHER PUBLICATIONS

Office action mailed on Jan. 15, 2013 for the Taiwan application No. 098137577, filing date: Nov. 5, 2009, p. 1 line 12~14, p. 2 line 14~26, p. 3, p. 4 line 12~26, p. 5 line 1~9 and line 13~20, p. 6 line 7~21, p. 7 line 6~23, p. 8 line 2~19 and line 25~26 and p. 9 line 1~6 and line 10~18.
Office action mailed on Apr. 26, 2012 for the China application No. 200910211087.6, p. 3 line 4~21, line 24~27 and line 29~34.

* cited by examiner

*Primary Examiner* — Kent Chang
*Assistant Examiner* — Benjamin Morales Fernandez
(74) *Attorney, Agent, or Firm* — Winston Hsu; Scott Margo

(57) ABSTRACT

An embodiment of the present invention provides a direction indicating device for generating a 2D direction indicating signal, which includes a base board, a first rectangular conductive plane formed on the base board, including a first sliding slot, a second rectangular conductive plane formed on the base board, overlapping the first rectangular conductive plane, and including a second sliding slot, a positioning axle perpendicular to the base board, passing through a space corresponding to overlap portions of the first sliding slot and the second sliding slot, for moving the first conductive plane along a first direction, and moving the second conductive plane along a second direction, and a control signal generating module for outputting the 2D direction indicating signal according to electric information of the first conductive plane and the second conductive plane.

15 Claims, 24 Drawing Sheets

FIG. 9A

| | | | | | | | | | | | Resistance between B and P_AX → |
|---|---|---|---|---|---|---|---|---|---|---|---|
| 0 | 100 | 200 | 300 | 400 | 500 | 600 | 700 | 800 | 900 | 1000 | 0 |
| 100 | 200 | 300 | 400 | 500 | 600 | 700 | 800 | 900 | 1000 | 1100 | 100 |
| 200 | 300 | 400 | 500 | 600 | 700 | 800 | 900 | 1000 | 1100 | 1200 | 200 |
| 300 | 400 | 500 | 600 | 700 | 800 | 900 | 1000 | 1100 | 1200 | 1300 | 300 |
| 400 | 500 | 600 | 700 | 800 | 900 | 1000 | 1100 | 1200 | 1300 | 1400 | 400 |
| 500 | 600 | 700 | 800 | 900 | 1000 | 1100 | 1200 | 1300 | 1400 | 1500 | 500 |
| 600 | 700 | 800 | 900 | 1000 | 1100 | 1200 | 1300 | 1400 | 1500 | 1600 | 600 |
| 700 | 800 | 900 | 1000 | 1100 | 1200 | 1300 | 1400 | 1500 | 1600 | 1700 | 700 |
| 800 | 900 | 1000 | 1100 | 1200 | 1300 | 1400 | 1500 | 1600 | 1700 | 1800 | 800 |
| 900 | 1000 | 1100 | 1200 | 1300 | 1400 | 1500 | 1600 | 1700 | 1800 | 1900 | 900 |
| 1000 | 1100 | 1200 | 1300 | 1400 | 1500 | 1600 | 1700 | 1800 | 1900 | 2000 | 1000 |
| 0 | 100 | 200 | 300 | 400 | 500 | 600 | 700 | 800 | 900 | 1000 | |

Resistance between A and P_AX →

(reference numeral 90 points to an interior cell)

| 1000 | 900 | 800 | 700 | 600 | 500 | 400 | 300 | 200 | 100 | 0 | 0 |
|------|-----|-----|-----|-----|-----|-----|-----|-----|-----|---|---|
| 1100 | 1000 | 900 | 800 | 700 | 600 | 500 | 400 | 300 | 200 | 100 | 100 |
| 1200 | 1100 | 1000 | 900 | 800 | 700 | 600 | 500 | 400 | 300 | 200 | 200 |
| 1300 | 1200 | 1100 | 1000 | 900 | 800 | 700 | 600 | 500 | 400 | 300 | 300 |
| 1400 | 1300 | 1200 | 1100 | 1000 | 900 | 800 | 700 | 600 | 500 | 400 | 400 |
| 1500 | 1400 | 1300 | 1200 | 1100 | 1000 | 900 | 800 | 700 | 600 | 500 | 500 |
| 1600 | 1500 | 1400 | 1300 | 1200 | 1100 | 1000 | 900 | 800 | 700 | 600 | 600 |
| 1700 | 1600 | 1500 | 1400 | 1300 | 1200 | 1100 | 1000 | 900 | 800 | 700 | 700 |
| 1800 | 1700 | 1600 | 1500 | 1400 | 1300 | 1200 | 1100 | 1000 | 900 | 800 | 800 |
| 1900 | 1800 | 1700 | 1600 | 1500 | 1400 | 1300 | 1200 | 1100 | 1000 | 900 | 900 |
| 2000 | 1900 | 1800 | 1700 | 1600 | 1500 | 1400 | 1300 | 1200 | 1100 | 1000 | 1000 |
| 1000 | 900 | 800 | 700 | 600 | 500 | 400 | 300 | 200 | 100 | 0 | |

Resistance between C and P_AX → (column, 92)

Resistance between B and P_AX →

FIG. 9B

| | | | | | | | | | | | Resistance between B and P_AX → |
|---|---|---|---|---|---|---|---|---|---|---|---|
| 0 | 100 | 200 | 300 | 400 | 500 | 600 | 700 | 800 | 900 | 1000 | 0 |
| 100 | 200 | 300 | 400 | 500 | 600 | 700 | 800 | 900 | 1000 | 1100 | 100 |
| 200 | 300 | 400 | 500 | 600 | 700 | 800 | 900 | 1000 | 1100 | 1200 | 200 |
| 300 | 400 | 500 | 600 | 700 | 800 | 900 | 1000 | 1100 | 1200 | 1300 | 300 |
| 400 | 500 | 600 | 700 | 800 | 900 | 1000 | 1100 | 1200 | 1300 | 1400 | 400 |
| 500 | 600 | 700 | 800 | 900 | 1000 | 1100 | 1200 | 1300 | 1400 | 1500 | 500 |
| 600 | 700 | 800 | 900 | 1000 | 1100 | 1200 | 1300 | 1400 | 1500 | 1600 | 600 |
| 700 | 800 | 900 | 1000 | 1100 | 1200 | 1300 | 1400 | 1500 | 1600 | 1700 | 700 |
| 800 | 900 | 1000 | 1100 | 1200 | 1300 | 1400 | 1500 | 1600 | 1700 | 1800 | 800 |
| 900 | 1000 | 1100 | 1200 | 1300 | 1400 | 1500 | 1600 | 1700 | 1800 | 1900 | 900 |
| 1000 | 1100 | 1200 | 1300 | 1400 | 1500 | 1600 | 1700 | 1800 | 1900 | 2000 | 1000 |
| 0 | 100 | 200 | 300 | 400 | 500 | 600 | 700 | 800 | 900 | 1000 | |

Resistance between A and P_AX →

FIG. 10A

| Resistance between B and P_AX ↓ \ Resistance between C and P_AX → | 0 | 100 | 200 | 300 | 400 | 500 | 600 | 700 | 800 | 900 | 1000 |
|---|---|---|---|---|---|---|---|---|---|---|---|
| 0 | | | | | | | | | | | 0 |
| 100 | | | | | | | | | | 0 | 100 |
| 200 | | | | | | | | | 0 | 100 | 200 |
| 300 | | | | | | | | 0 | 100 | 200 | 300 |
| 400 | | | | | | | 0 | 100 | 200 | 300 | 400 |
| 500 | | | | | | 0 | 100 | 200 | 300 | 400 | 500 |
| 600 | | | | | 0 | 100 | 200 | 300 | 400 | 500 | 600 |
| 700 | | | | 0 | 100 | 200 | 300 | 400 | 500 | 600 | 700 |
| 800 | | | 0 | 100 | 200 | 300 | 400 | 500 | 600 | 700 | 800 |
| 900 | | 0 | 100 | 200 | 300 | 400 | 500 | 600 | 700 | 800 | 900 |
| 1000 | 0 | 100 | 200 | 300 | 400 | 500 | 600 | 700 | 800 | 900 | 1000 |
| 1100 | 100 | 200 | 300 | 400 | 500 | 600 | 700 | 800 | 900 | 1000 | |
| 1200 | 200 | 300 | 400 | 500 | 600 | 700 | 800 | 900 | 1000 | 1100 | |
| 1300 | 300 | 400 | 500 | 600 | 700 | 800 | 900 | 1000 | 1100 | 1200 | |
| 1400 | 400 | 500 | 600 | 700 | 800 | 900 | 1000 | 1100 | 1200 | 1300 | |
| 1500 | 500 | 600 | 700 | 800 | 900 | 1000 | 1100 | 1200 | 1300 | 1400 | |
| 1600 | 600 | 700 | 800 | 900 | 1000 | 1100 | 1200 | 1300 | 1400 | 1500 | |
| 1700 | 700 | 800 | 900 | 1000 | 1100 | 1200 | 1300 | 1400 | 1500 | 1600 | |
| 1800 | 800 | 900 | 1000 | 1100 | 1200 | 1300 | 1400 | 1500 | 1600 | 1700 | |
| 1900 | 900 | 1000 | 1100 | 1200 | 1300 | 1400 | 1500 | 1600 | 1700 | 1800 | |
| 2000 | 1000 | 1100 | 1200 | 1300 | 1400 | 1500 | 1600 | 1700 | 1800 | 1900 | |
| | 1000 | 900 | 800 | 700 | 600 | 500 | 400 | 300 | 200 | 100 | |

FIG. 11B

DIRECTION INDICATING DEVICE

BACKGROUND OF THE INVENTION

1. Field of the Invention

The present invention relates to a direction indicating device, and more particularly, to a direction indicating device capable of enhancing accuracy, durability and reliability.

2. Description of the Prior Art

A direction indicating device is an electronic device for generating direction instructions, and can be applied to a computer system, a multimedia device, an entertainment equipment, a household appliance, a tool machine etc. Normally, a direction indicating device comprises keys or trigger units corresponding to four directions (up, down, left and right), such as direction keys in a keyboard, a joystick of a game console.

A direction indicating device realized by keys can be easily assembled, but does not accurately respond to user's demand. Please refer to FIG. 1A, which is a schematic diagram of a conventional key-based direction indicating device 10. The direction indicating device 10 mainly includes keys PAD_UP, PAD_DW, PAD_LT, PAD_RT, corresponding to four directions up, down, left and right, respectively. Bottoms of the keys PAD_UP, PAD_DW, PAD_LT, PAD_RT are coated with a conductive material, such as graphite, and are formed with elastic mechanisms, for evenly keeping a fixing distance between the conductive material and detection circuits DET_UP, DET_DW, DET_LT, DET_RT. The detection circuits DET_UP, DET_DW, DET_LT, DET_RT are connected to a controller (not shown in FIG. 1A). The controller generates a corresponding direction control instruction according to whether the detection circuit is turned on. For example, when a user presses the key PAD_UP, the conductive material underneath the key PAD_UP touches the detection circuit DET_UP, such that the detection circuit DET_UP is turned on. Accordingly, the controller determines a user presses the key PAD_UP, and outputs the corresponding direction instruction.

As can be seen from the above, when one of the detection circuits DET_UP, DET_DW, DET_LT, DET_RT is turned on, the controller generates the corresponding direction instruction. However, such one-or-zero method does not respond demand in between, such as Graphical User Interface (GUI) applications.

In addition, no matter a computer game or a TV game console is operated by the usage of a keyboard or a joystick, a game software or a joystick controller determines direction, velocity, and acceleration of movement according to trigger times and trigger period of keys corresponding to specific directions. For example, please refer to FIG. 1B, which is a schematic diagram of a direction control module 12 of a conventional joystick. In the direction control module 12, a region surrounded by a dotted line represents a position of a control stick. Similar to the operations of the key-based direction indicating device 10, when the user forces the control stick to touch one of trigger units TR_UP, TR_DW, TR_LT, TR_RT, the touched trigger unit sends a signal to a joystick controller, so as to generate a corresponding direction instruction. For example, when the user forces the control stick upwardly to touch the trigger unit TR_UP, the trigger unit TR_UP sends a corresponding "up" direction instruction. Then the game software determines direction, velocity, and acceleration of movement according to times, periods of the direction instruction, and makes the corresponding response.

Both of the key-based direction indicating device 10 and the direction control module 12 for a joystick utilize the keys or the trigger units corresponding to different directions, which act as switches. Such kind of operation is favorable for a menu-based operation, but does not accurately respond to user control for GUI or game operations.

SUMMARY OF THE INVENTION

It is therefore an objective of the present invention to provide a direction indicating device.

The present invention discloses a direction indicating device for generating a two dimensional (2D) direction indicating signal in an electronic device, which includes a base board, a first rectangular conductive plane, formed on the base board, including a first sliding slot, a second rectangular conductive plane, formed on the base board, overlapping the first rectangular conductive plane, including a second sliding slot, a positioning axle, perpendicular to the base board, passing through a space corresponding to overlap portions of the first sliding slot and the second sliding slot, for moving the first rectangular conductive plane along a first direction, and moving the second rectangular conductive plane along a second direction when an external force is received, and a control signal generating module, for outputting the 2D direction indicating signal according to electric information of the first rectangular conductive plane relative to the second rectangular conductive plane and electric information of the second rectangular conductive plane relative to the first rectangular conductive plane.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 9A and FIG. 9B are schematic diagrams of conversion tables used in FIG. 8 according to an embodiment of the present invention, respectively.

FIG. 10A and FIG. 10B are schematic diagrams illustrating that the control signal generating module shown in FIG. 8 utilizes the conversion tables shown in FIG. 9A and FIG. 9B to determine a movement of the direction indicating device shown in FIG. 2A and FIG. 2C, respectively.

FIG. 11A and FIG. 11B are schematic diagrams illustrating that the control signal generating module shown in FIG. 8 utilizes the conversion tables shown in FIG. 9A and FIG. 9B to determine another movement of the direction indicating device shown in FIG. 2A and FIG. 2C, respectively.

DETAILED DESCRIPTION

Figure 1A:
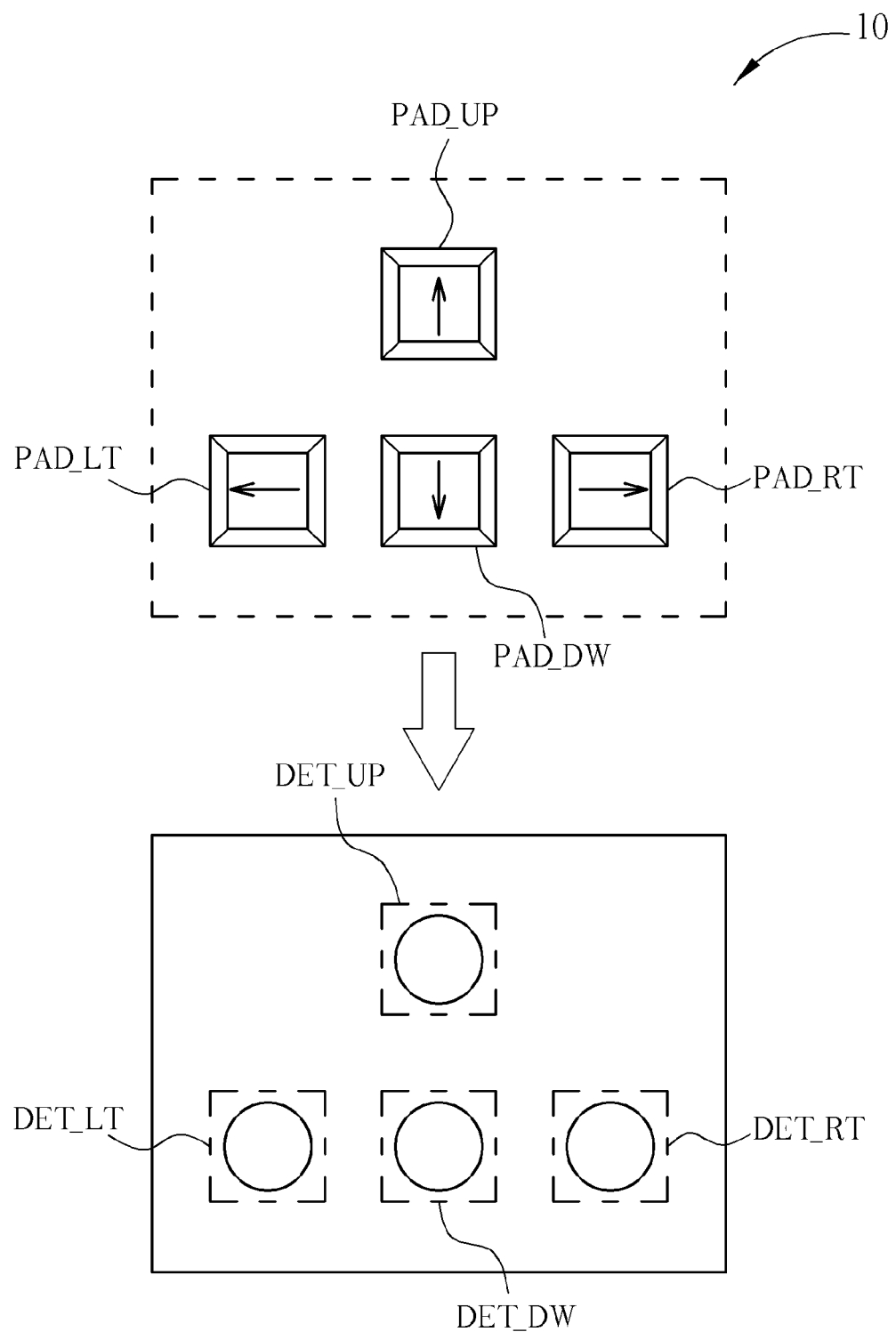
FIG. 1A is a schematic diagram of a conventional key-based direction indicating device.
Figure 1B:
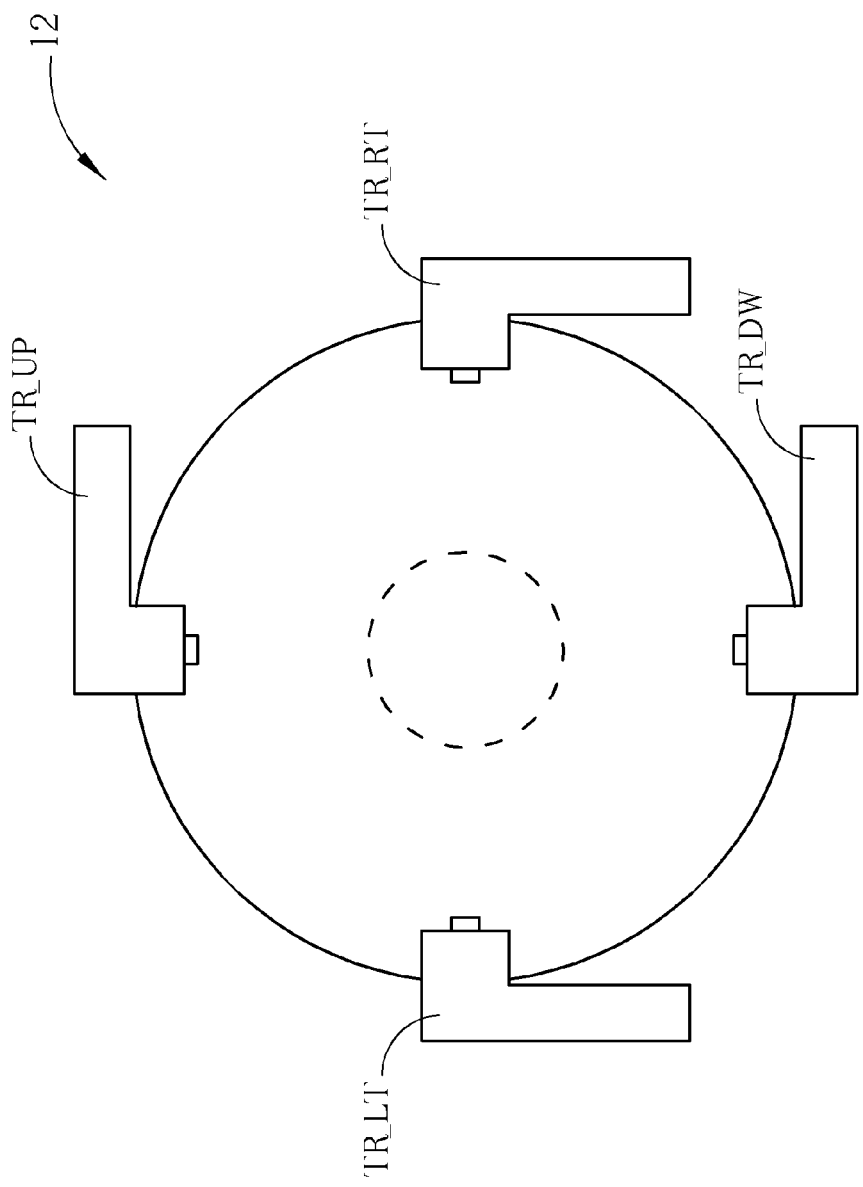
FIG. 1B is a schematic diagram of a direction control module of a conventional joystick.
Figure 2A:
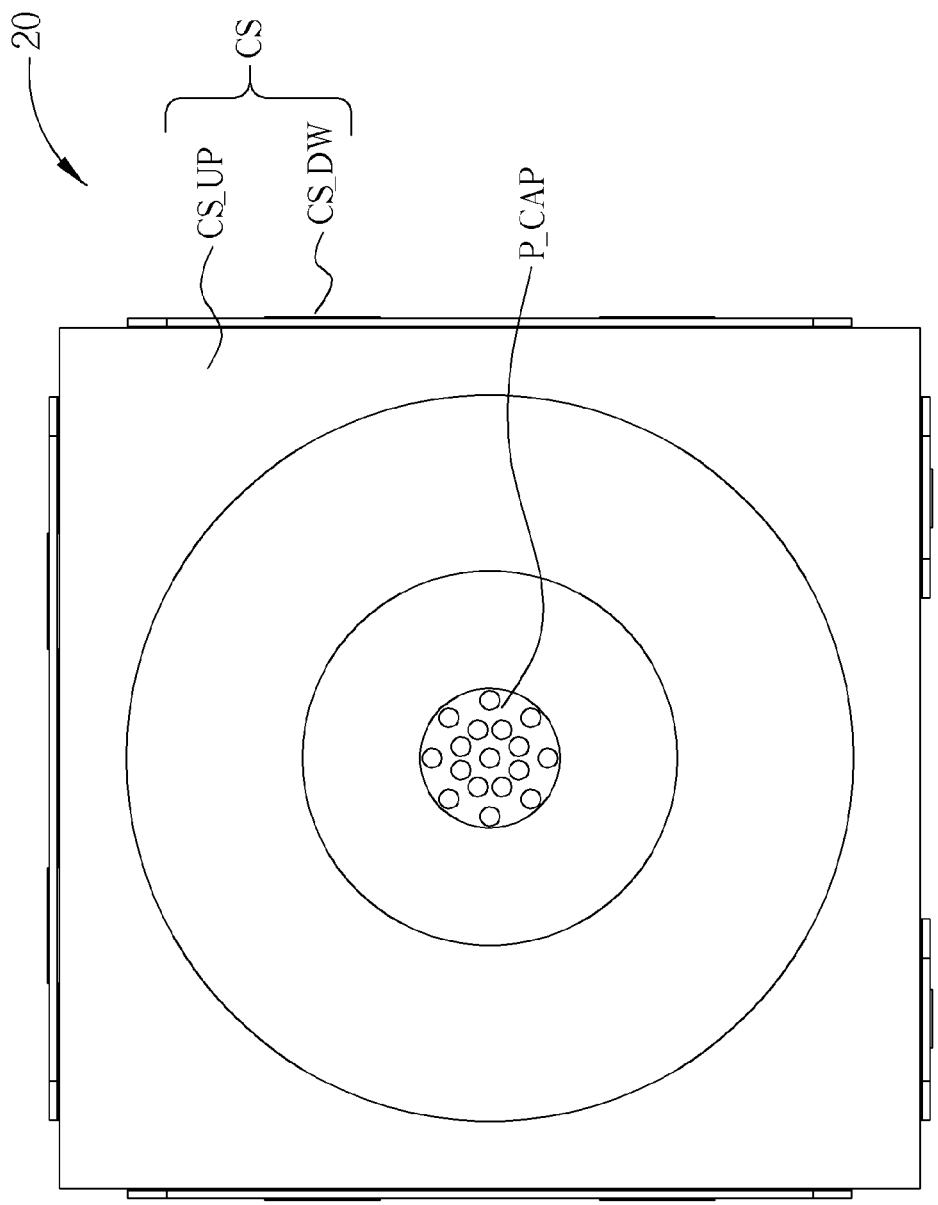
FIG. 2A, FIG. 2B and FIG. 2C are a top-view, a side-view and an isometric-view diagrams of a direction indicating device according to an embodiment of the present invention, respectively.
Figure 2B:
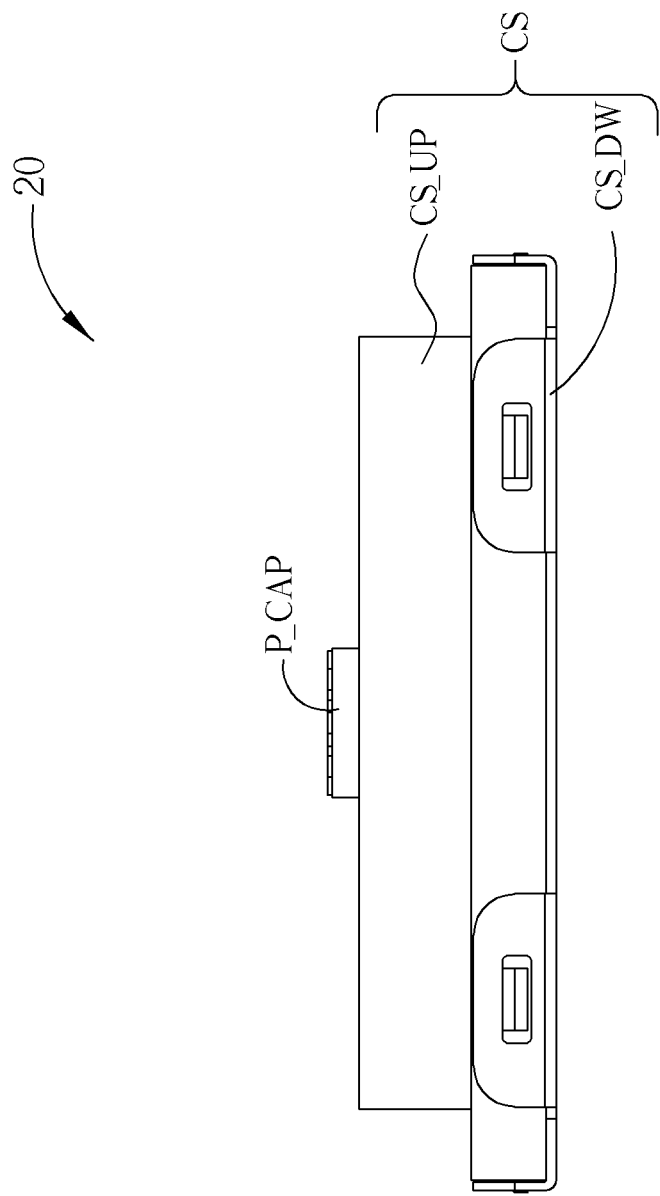
Figure 2C:
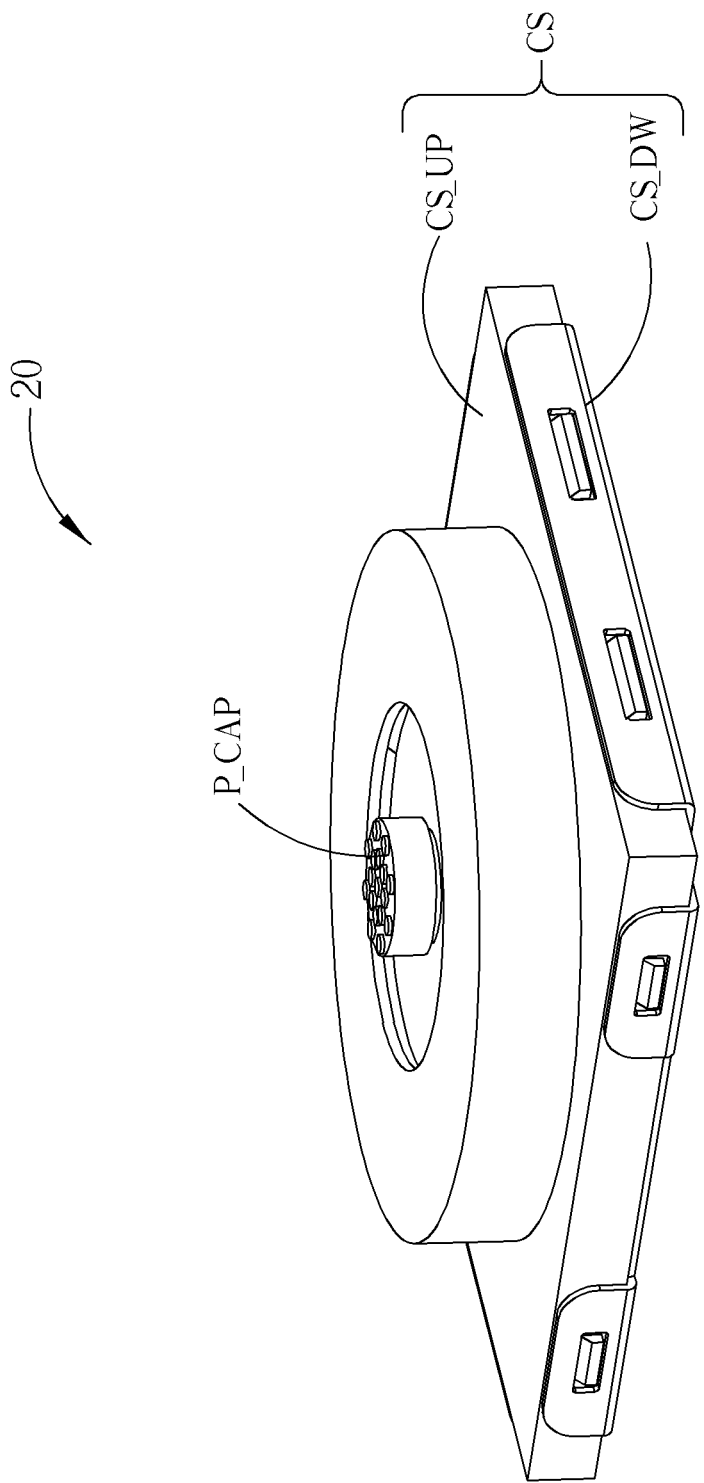

Please refer to FIG. 2A, FIG. 2B and FIG. 2C, which are a top-view, side-view and isometric-view diagrams of a direction indicating device 20 according to an embodiment of the present invention, respectively. As shown in FIG. 2A to FIG. 2C, an exterior structure of the direction indicating device 20 includes a housing CS and a positioning axis upper cap P_CAP. The housing CS includes an upper cap CS_UP and a dock CS_DW, which are assembled by a hook and a slot. The positioning axle upper cap P_CAP is preferably made of an insulation material. A user can move the positioning axle upper cap P_CAP with one or multiple fingers depending on a size of the direction indicating device 20, so as to perform direction control. Detailed operations can be referred to the following description.

Figure 3A:
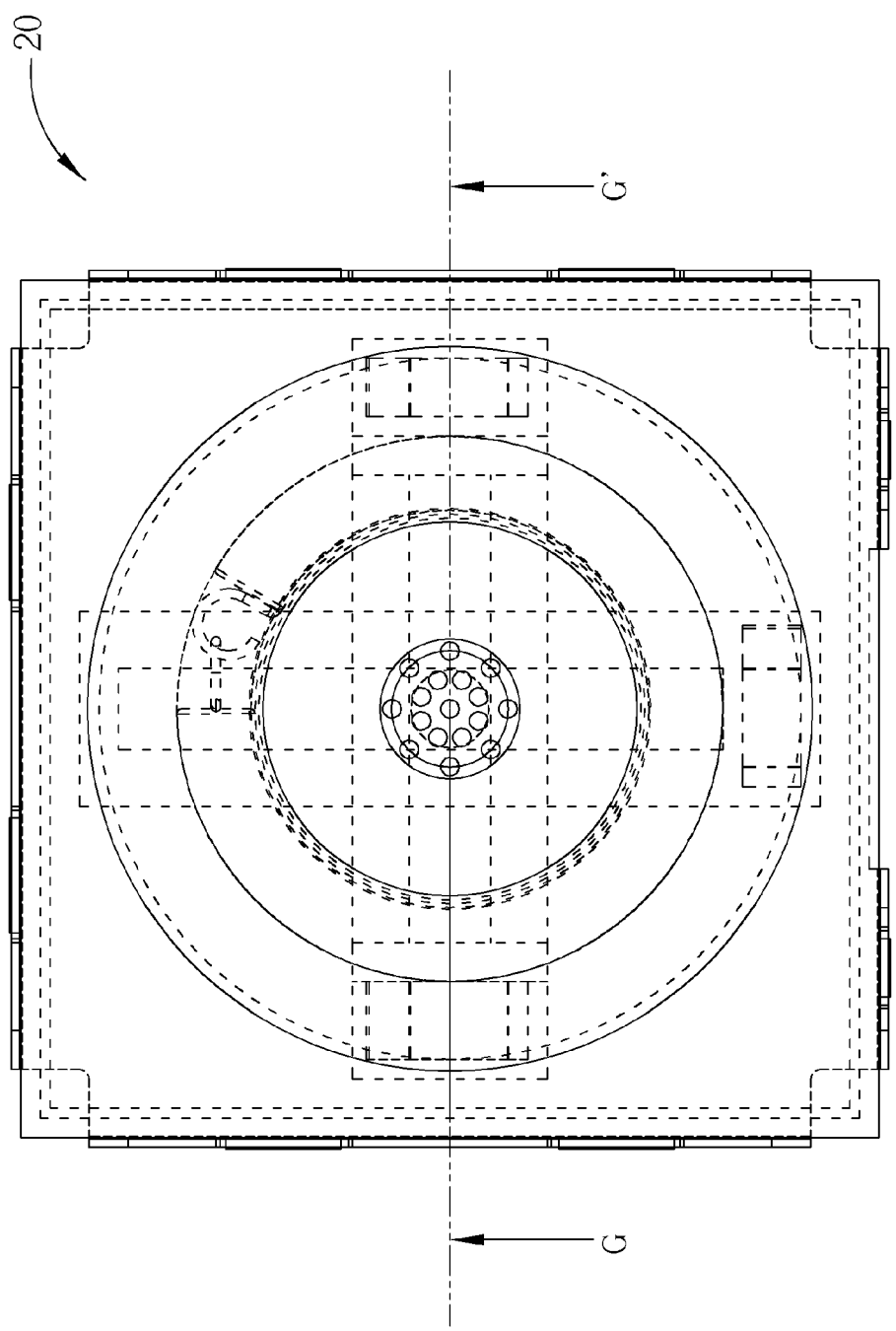
FIG. 3A is a top/perspective-view diagram of the direction indicating device shown in FIG. 2A to FIG. 2C.
Figure 3B:
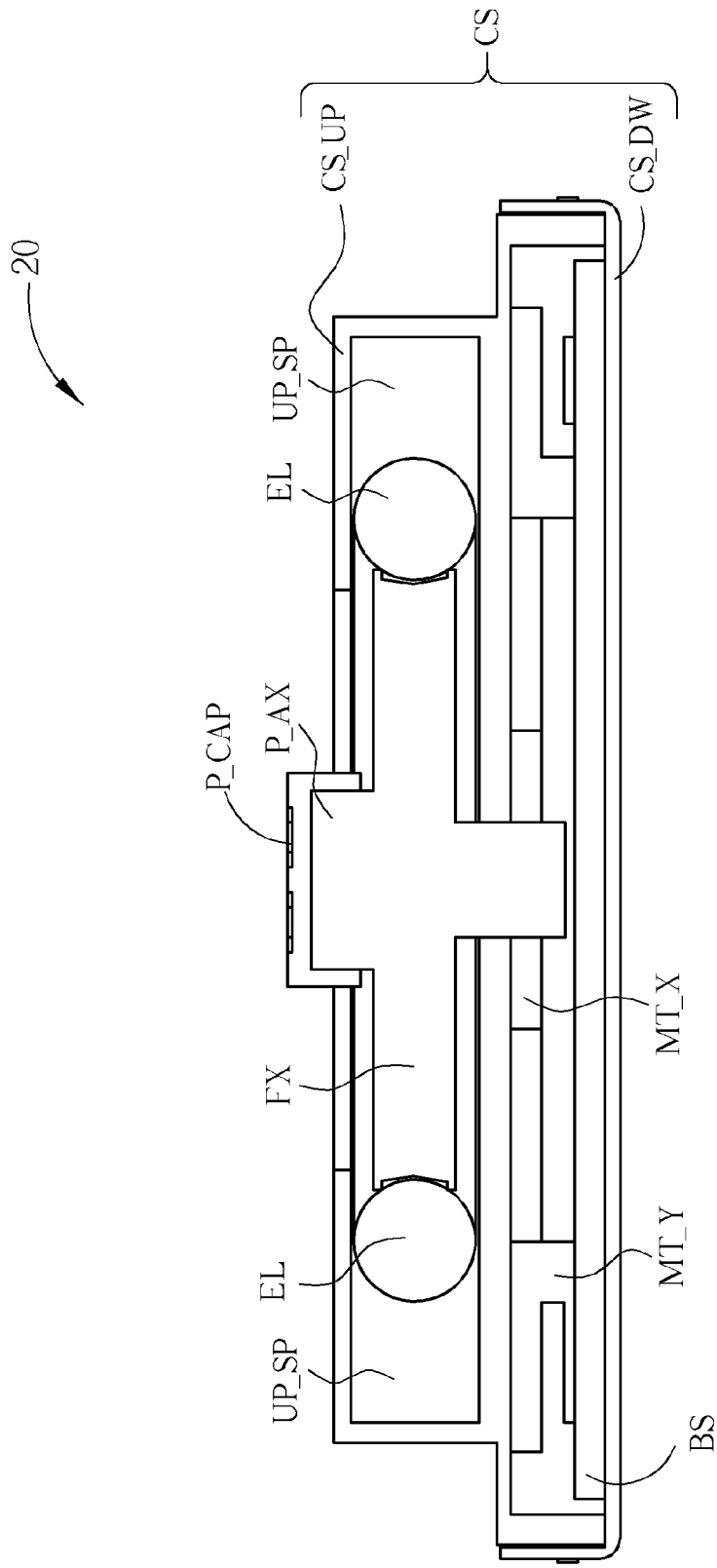
FIG. 3B is a sectional-view diagram of the direction indicating device shown in FIG. 2A to FIG. 2C.
Figure 4A:
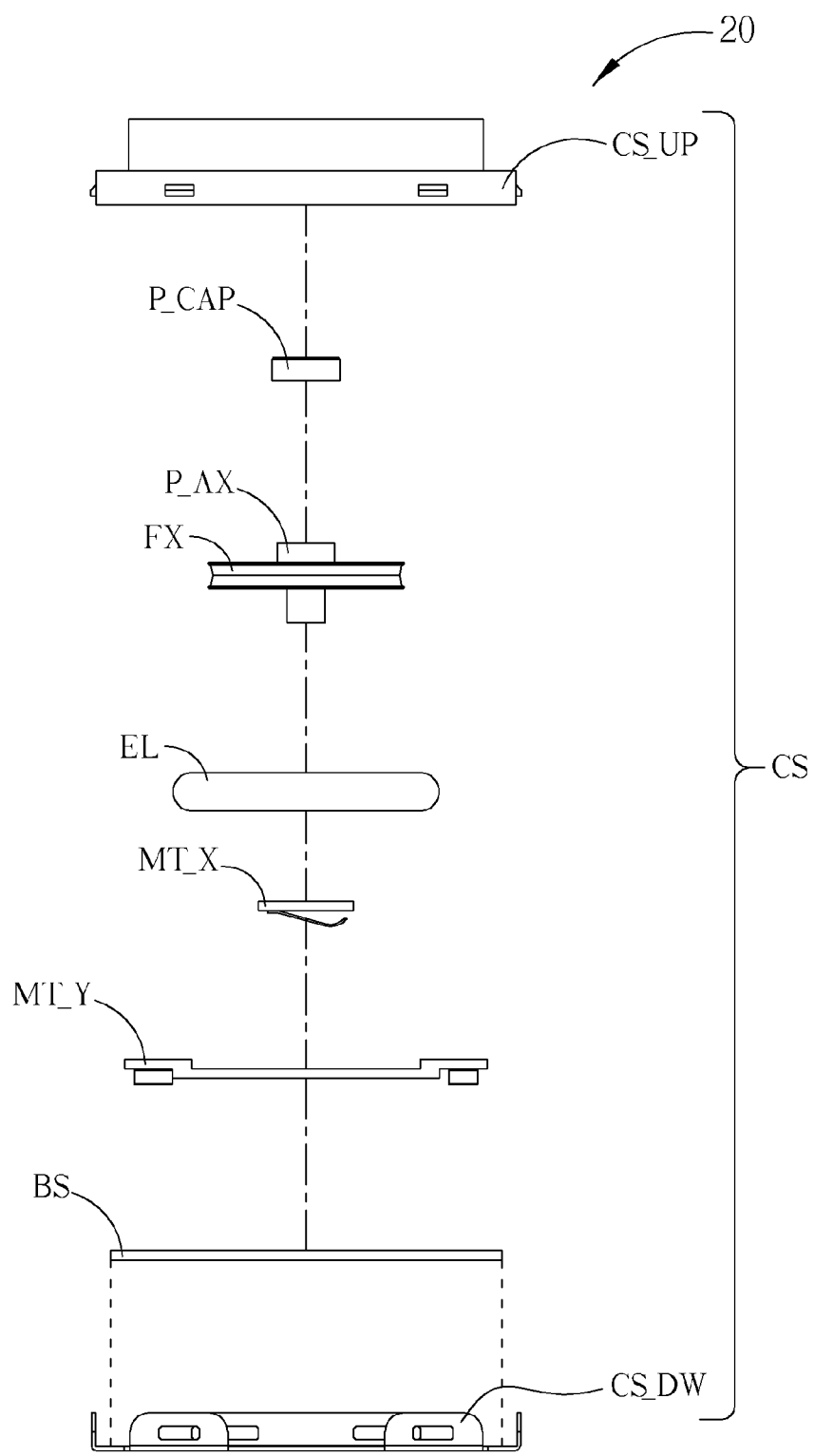
FIG. 4A and FIG. 4B are a side-view and an isometric-view diagrams of fabrication of the direction indicating device shown in FIG. 2A to FIG. 2C, respectively.
Figure 4B:
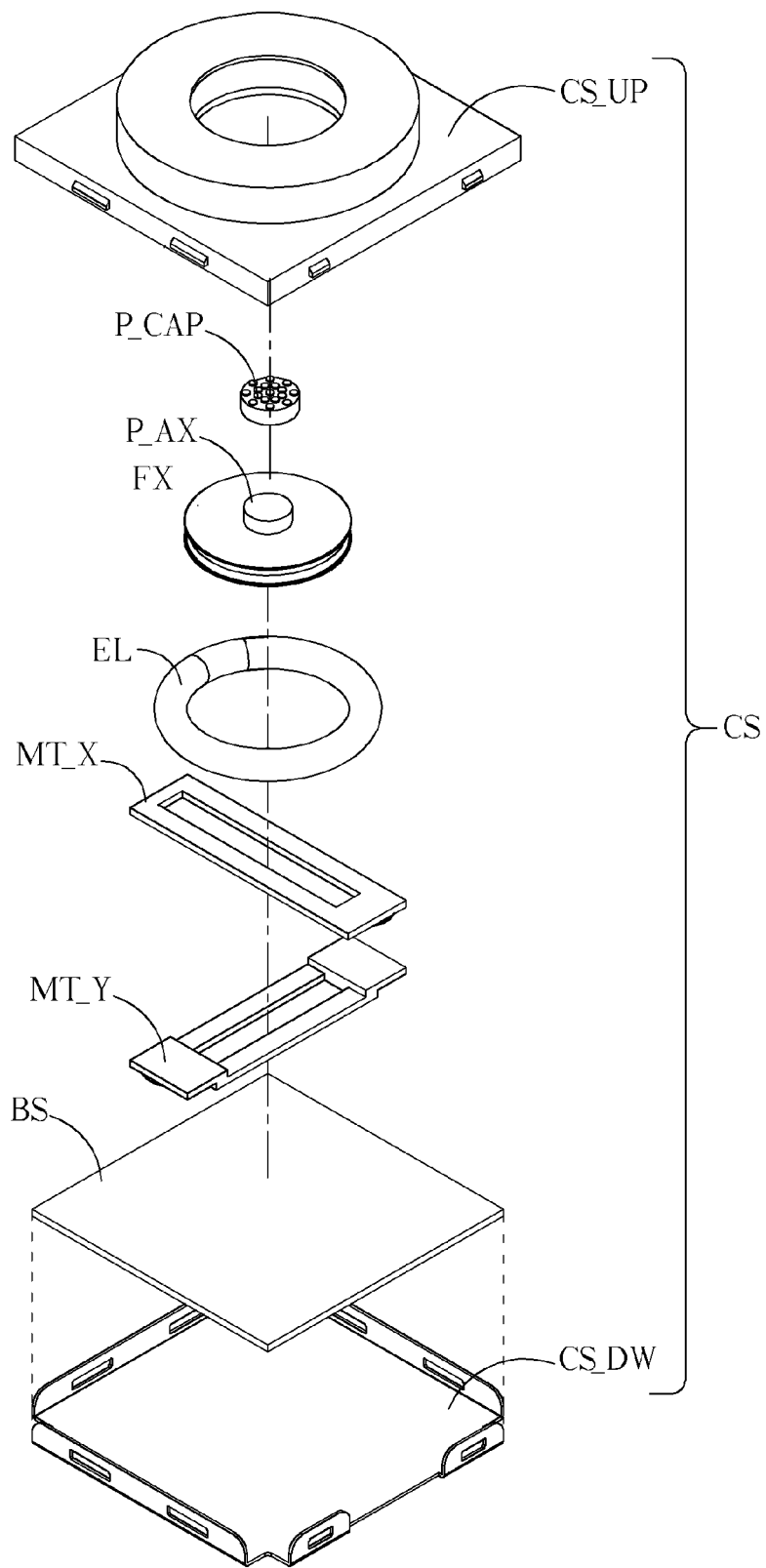

As for an interior structure of the direction indicating device 20, please refer to FIG. 3A, FIG. 3B, FIG. 4A, and FIG. 4B. FIG. 3A is a top/perspective-view diagram of the direction indicating device 20. FIG. 3B is a sectional-view diagram along a line G-G' shown in FIG. 3A. FIG. 4A and FIG. 4B are a side-view and isometric-view diagrams of fabrication of the direction indicating device 20, respectively. An interior structure of the housing CS of the direction indicating device 20 includes a positioning axle P_AX, a ring fixing component FX, an elastic component EL, rectangular conductive planes MT_X, MT_Y and a base board BS from top to bottom. The rectangular conductive planes MT_X, MT_Y are perpendicular to each other, and include hollow sliding slots. The positioning axle P_AX passes through overlap portions of the rectangular conductive planes MT_X, MT_Y. The ring fixing component FX is disposed around the positioning axle P_AX, and is enclosed by the elastic component EL. After well assembled, the ring fixing component FX and the elastic component EL are located at a cavity UP_SP of the upper cap CS_UP. The cavity UP_SP has sufficient space for the positioning axle P_AX (or the positioning axle upper cap P_CAP) to move within appropriate range when an external force is received. The elastic component EL can return the positioning axle P_AX to an initial position when the external force is removed. Besides, the base board BS is utilized for supporting the rectangular conductive planes MT_X, MT_Y, and can be a Printed Circuit Board (PCB) having a control signal generating module.

Figure 5:
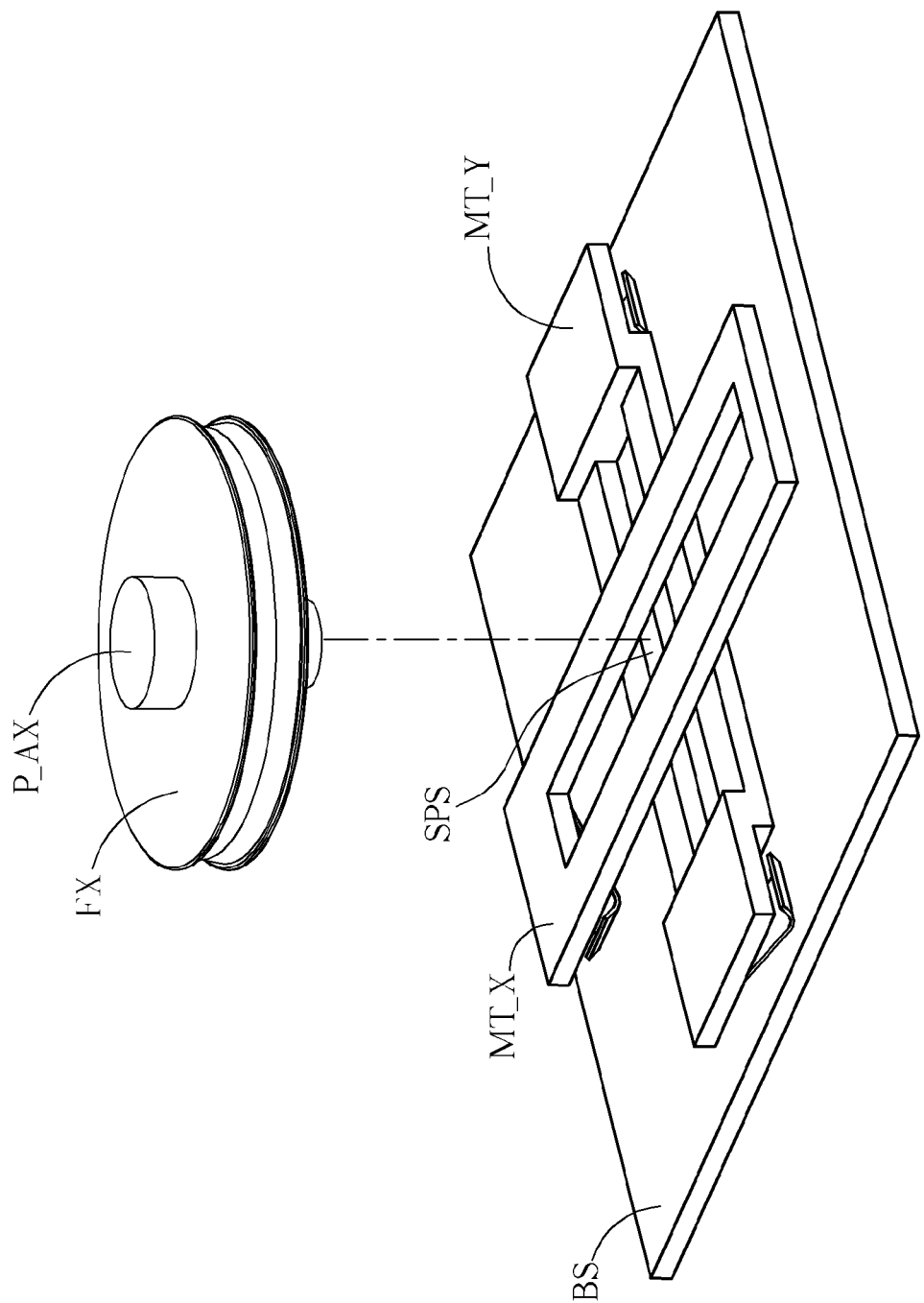
FIG. 5 is a schematic diagram of the direction indicating device shown in FIG. 2A to FIG. 2C after the rectangular conductive planes are assembled with the base board.

More detailed description can be referred to FIG. 5, which is a schematic diagram of the direction indicating device 20 after the rectangular conductive planes MT_X, MT_Y are assembled with the base board BS. As can be seen from FIG. 5, the rectangular conductive planes MT_X, MT_Y are perpendicular to each other, and a space SPS is formed between the sliding slots of the rectangular conductive planes MT_X, MT_Y. The space SPS is utilized for accommodating the positioning axle P_AX, i.e. the positioning axle P_AX passes through the space SPS corresponding to overlap potions formed by the sliding slots of the rectangular conductive planes MT_X, MT_Y.

Figure 6A:
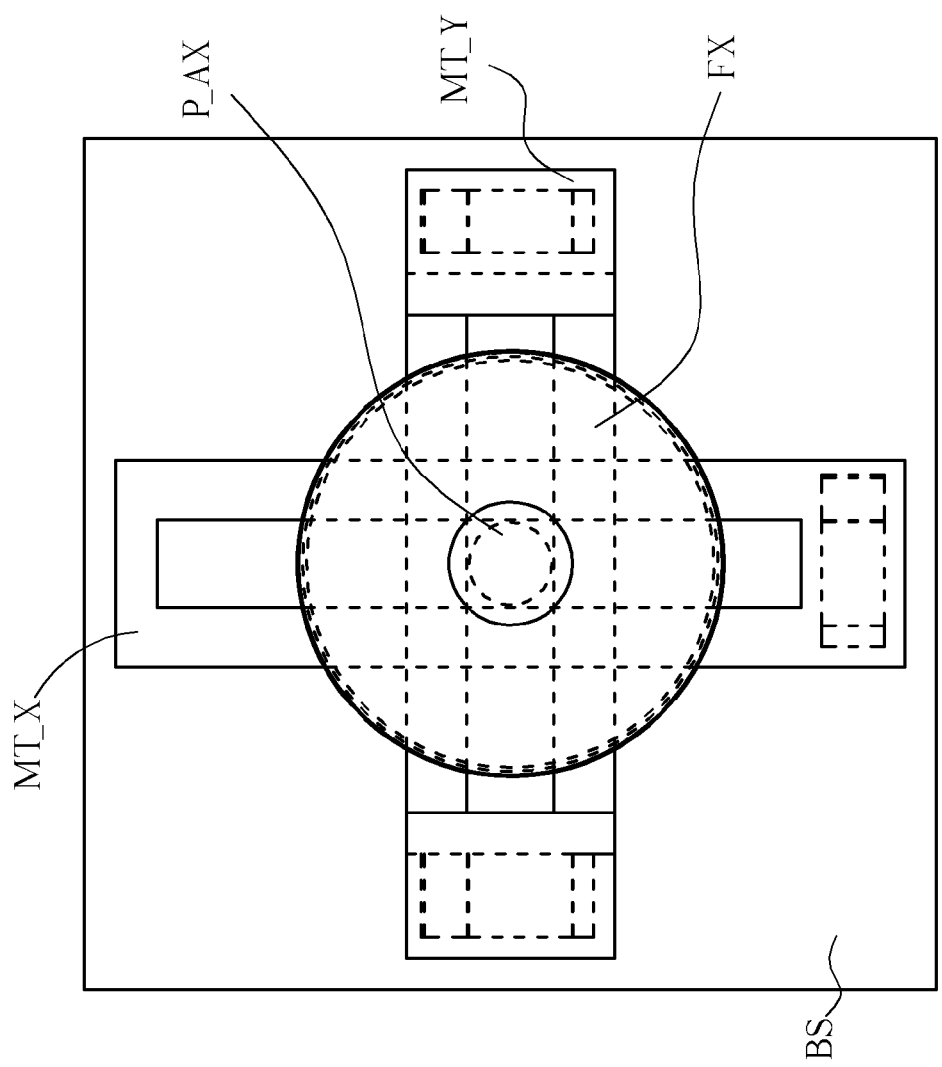
FIG. 6A is a perspective-view diagram of the positioning axle, the rectangular conductive planes and the base board when the direction indicating device shown in FIG. 2A to FIG. 2C does not receive an external force.
Figure 6B:
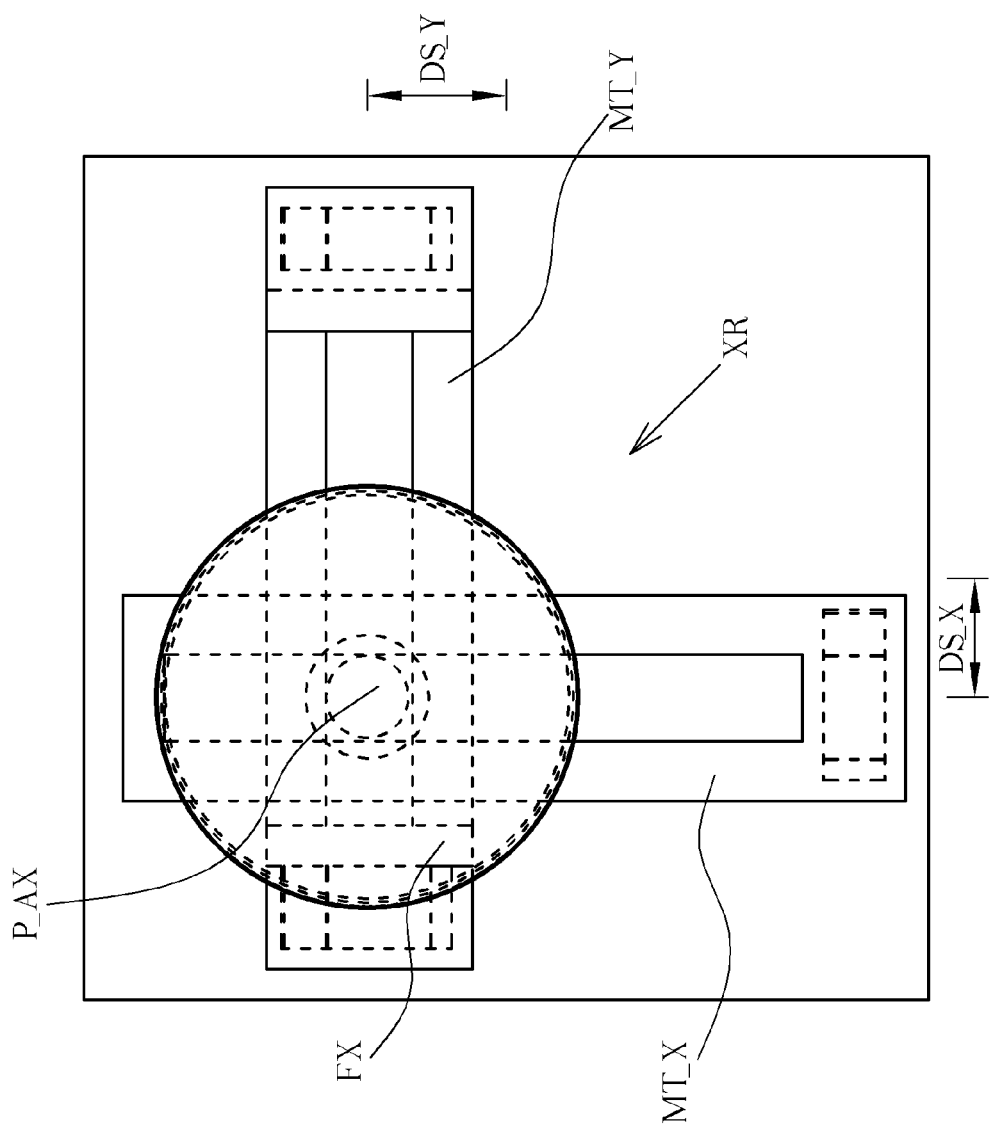
FIG. 6B is a perspective-view diagram of the positioning axle, the rectangular conductive planes and the base board when the direction indicating device shown in FIG. 2A to FIG. 2C receives an external force.

Operations of the direction indicating device 20 can be referred to FIG. 6A and FIG. 6B. FIG. 6A is a perspective-view diagram of the positioning axle P_AX, the rectangular conductive planes MT_X, MT_Y and the base board BS when the direction indicating device 20 does not receive an external force. If the positioning axle P_AX receives an external force with a direction corresponding to an arrow XR, the positioning axle P_AX pushes the rectangular conductive planes MT_X, MT_Y to slide on the base board BS, leading to an illustration shown in FIG. 6B. As can be seen from FIG. 6B, a center line of the rectangular conductive plane MT_X moves a distance DS_X, and a center line of rectangular conductive plane MT_Y moves a distance DS_Y. The distance DS_X and the distance DS_Y are corresponding to the external force, and can reflect to the control.

As can be seen from the above, when the positioning axle P_AX is moved by an external force, the positioning axle P_AX pushes the rectangular conductive planes MT_X, MT_Y to move corresponding distances. In other words, when external force is not received, the positioning axle P_AX is located in the center of the rectangular conductive planes MT_X and MT_Y due to the elastic component EL. When the positioning axle P_AX is moved by the external force, the positioning axle P_AX is moved away from the center of the rectangular conductive planes MT_X and MT_Y according to direction and magnitude of the external force (in other words, the external force moves the rectangular conductive planes MT_X and MT_Y away from initial positions through the positioning axle P_AX). When the external force is removed, the elastic component EL returns the positioning axle to an initial position, i.e. the center of the rectangular conductive planes MT_X and MT_Y. Therefore, when the positioning axle P_AX is moved by an external force, the user control is determined according to distances between ends of the rectangular conductive planes MT_X, MT_Y and the positioning axle P_AX.

Figure 7A:
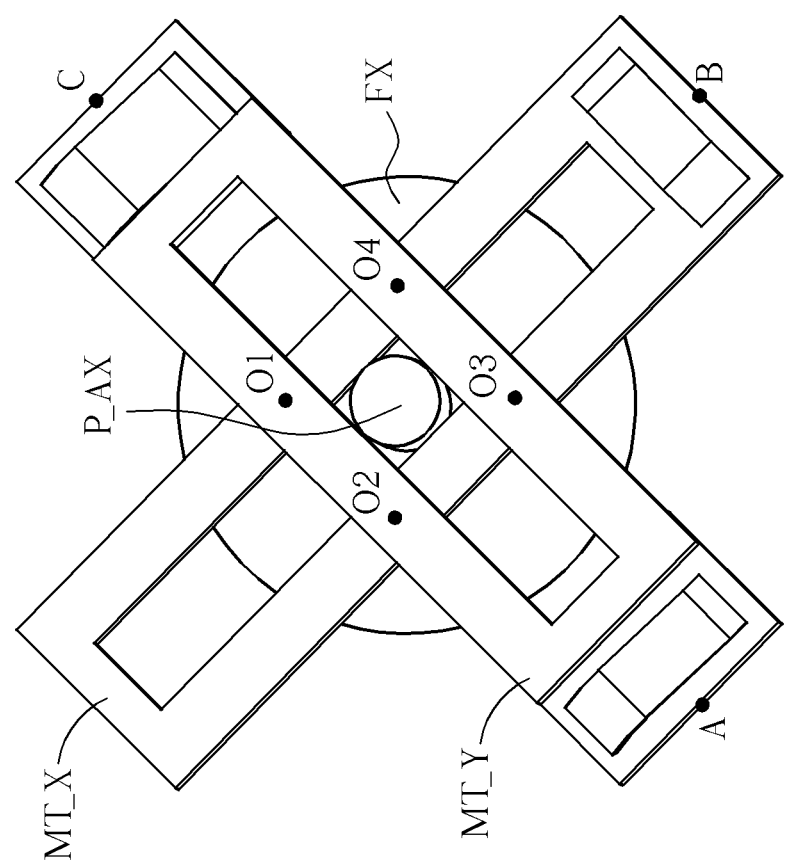
FIG. 7A is a schematic diagram as viewed from the base board toward the rectangular conductive planes and the positioning axle when the positioning axle of the direction indicating device shown in FIG. 2A to FIG. 2C does not receive an external force.
Figure 7B:
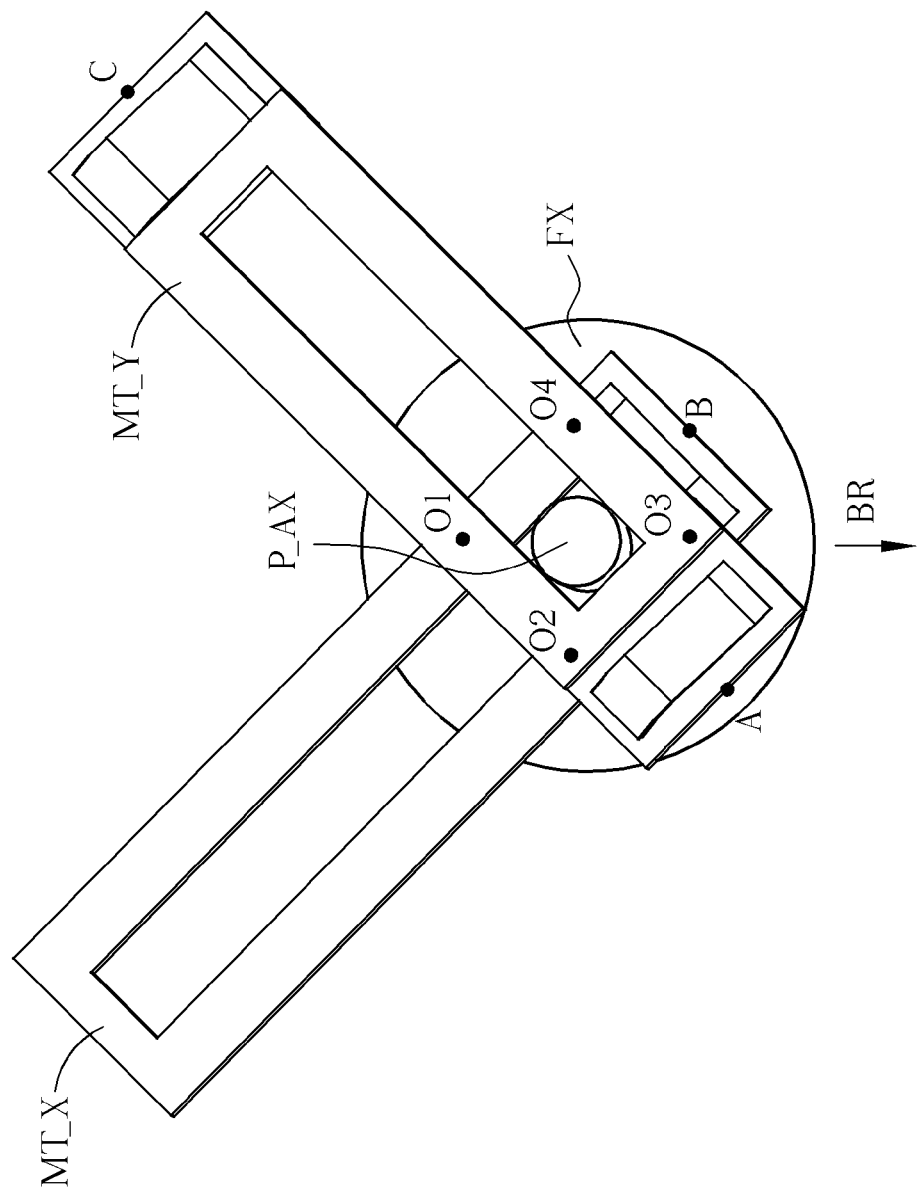
FIG. 7B is a schematic diagram as viewed from the base board toward the rectangular conductive planes and the positioning axle when the positioning axle of the direction indicating device shown in FIG. 2A to FIG. 2C receives an external force with a direction corresponding to an arrow.

To correctly determine a distance that the positioning axle P_AX is moved by the external force is complicated. In fact, there are some other methods to determine the user control. For example, please refer to FIG. 7A and FIG. 7B. FIG. 7A is a schematic diagram as viewed from the base board BS toward the rectangular conductive planes MT_X, MT_Y and the positioning axle P_AX when the positioning axle P_AX does not receive any external force. FIG. 7B is a schematic diagram as viewed from the base board BS toward the rectangular conductive planes MT_X, MT_Y and the positioning axle P_AX when the positioning axle P_AX receives an external force with a direction corresponding to an arrow BR. Points A, C represent centers of two ends of the rectangular conductive plane MT_Y, and a point B represents a center of one end of the rectangular conductive plane MT_X. Points O1~O4 represent intersections of the rectangular conductive planes MT_X and MT_Y. First, for the sake of brevity, L[A,O3] represents a length of a shortest path between point A and point O3, L[O3,B] represents a length of point a shortest path between O3 and point B, L[A,B] represents a length of a shortest path between point A and point B, L[B,O4] represents a length of a shortest path between point B and point O4, L [O4,C] represents a length of a shortest path between point O4 and point C, and L[B,C] represents a length of a shortest path between point B and point C. In other words, L [A,B] =L[A,O3]+L[O3,B], and L[B,C]=L[B,O4]+L[O4,C]. Besides, inside the housing CS, a range positioning axle P_AX is moved by an external force is limited by lengths of the rectangular conductive planes MT_X and MT_Y. In this embodiment, the length L[A,O3], the length L[O3,B], the length L[B,O4] and the length L[O4,C] have the same maximum max_T and minimum min_T. Therefore, ranges of the length L[A,O3] and the length L[O3,B] can be represented as:

min_T≤L[A,O3]≤max_T, and min_$_{T\le [}$O3,B]≤max_T.

Since L[A,B]=L[A,O3]+L[O3,B], after the length L[A,B] is acquired, a limited line or a point (when the length L[A,B] is equal to 2×min_T or 2×max_T) corresponding to the length L[A,B] can be defined in a 2D coordinate system accordingly. Similarly, after the length L[B,C] is acquired, a limited line or a point (when the length L[B,C] is equal to 2×min_T or 2×max_T) corresponding to the length L[B,C] can be defined in the 2D coordinate system accordingly as well. In the same coordinate system, an intersection of the two limited lines corresponding to the length L[A,B] and the length L[B,C] can represent movement of positioning axle P_AX after an external force is received.

In a word, since the length L[A,B] and the length L[B,C] are related to the location of the positioning axle P_AX, and are limited by the lengths of the rectangular conductive planes MT_X and MT_Y. Therefore, after the length L[A,B] and the length L[B,C] are acquired, the two corresponding limited lines can be determined, and the intersection of the two limited lines is corresponding to the location of the positioning axle P_AX. Noticeably, since the points O3, O4 are fixed relative to an axis of the positioning axle P_AX, and distances between the points O3, O4 and the point B are the same. Therefore, the points O3, O4 can be considered as the same point during process of determining the length L[A,B] and the length L[B,C], and movements of the points O3, O4 are movement of the positioning axle P_AX. In other words, instead of calculating distances between the points A, B, C and the axis of the positioning axle P_AX, the movement of the positioning axle P_AX is determined by utilizing the relation between the points A, B, C and the points O3, O4. Certainly, the aforementioned concept is based on the condition that the intersections O1~O4 of the rectangular conductive planes MT_X and MT_Y are corresponding to four points of a square. In other embodiments, the points O1~O4 are not limited to four points of a square, and the intersections of the rectangular conductive planes MT_X and MT_Y are not limited to four as well, i.e. can be more or less than four according to design requirement.

There are many methods for determining the length L[A,B] and the length L[B,C], and one of the methods can be realized by measuring resistance. As known by those skilled in the art, resistance R of a conductive object can be expressed as:

$R=\rho \times LN \div AR,$

ρ denotes resistivity of the conductive object, LN denotes the length of the conductive object, and AR represents the cross-section area of the conductive object.

Therefore, assume that the resistivity ρ and the cross-section area AR are fixed value (or with little effect), such as a rectangular conductive plane, then the resistance R is proportional to the length LN. Accordingly, in FIG. 7A and FIG. 7B, resistance between the point A and the point B and resistance between the point B and the point C can be measured and properly converted into corresponding length L[A,B] and length L[B,C], such that the movement of the positioning axle P_AX after an external force is received can be acquired, so as to determine the user control.

Figure 8:
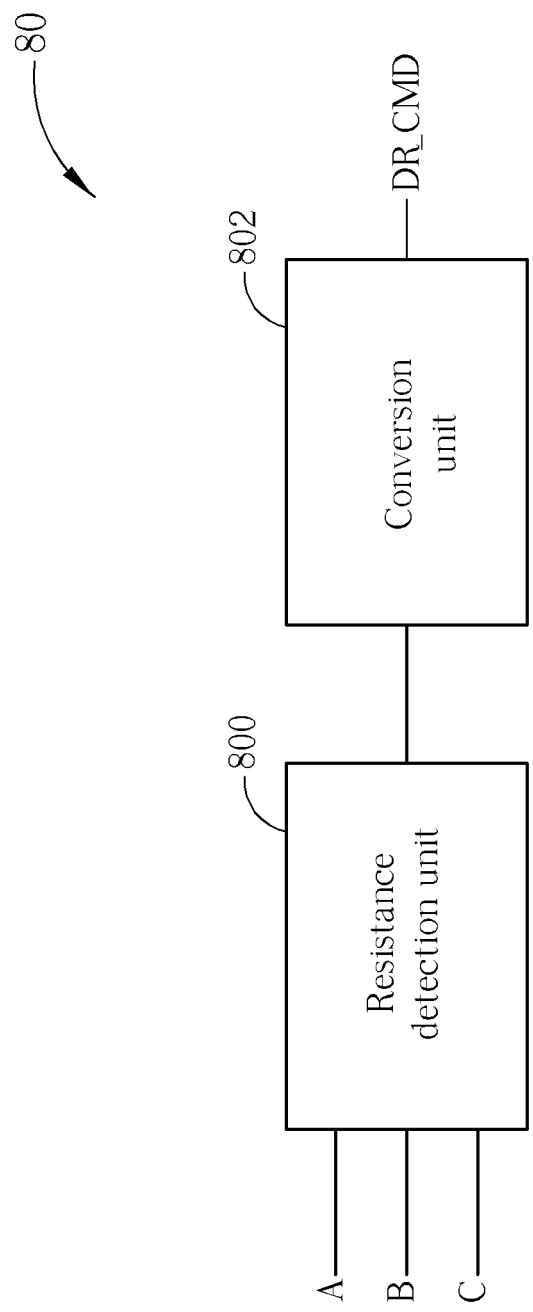
FIG. 8 is a schematic diagram of a control signal generating module according to an embodiment of the present invention.

Therefore, please refer to FIG. 8, which is a schematic diagram of a control signal generating module 80 according to an embodiment of the present invention. The control signal generating module 80 is utilized in the direction indicating device 20, and is formed on the base board BS, or assembled with the direction indicating device 20 by other methods. The control signal generating module 80 includes a resistance detection unit 800 and a conversion unit 802. The resistance detection unit 800 is coupled to the points A, B, C, and is utilized for detecting resistance R_AB between the point A and the point B and resistance R_BC between the point B and the point C. The conversion unit 802 determines the movement of the positioning axle according to the resistance R_AB and R_BC, and generates a control signal DR_CMD accordingly. Noticeably, since some paths between the point A and the point B and between the point B and the point C are overlapped, the resistance detection unit 800 detects the resistance R_AB first, and then detects the resistance R_BC, for ensuring accuracy. Besides, operation concept of the conversion unit 802 is converting the resistance R_AB, R_BC into the length L[A,B], L[B,C] first, then deriving the movement of the positioning axle P_AX from the length L[A,B], L[B,C], and generating the control signal DR_CMD accordingly. Noticeably, when the resistance R_AB, R_BC are converted, materials and thicknesses of the rectangular conductive planes MT_X and MT_Y should be considered, as well as the intersections of the rectangular conductive planes MT_X and MT_Y.

For example, if the intersections of the rectangular conductive planes MT_X and MT_Y are as the four points O1~O4 shown in FIG. 7A, the resistance R_AB is determined by the resistance between the point A and the point O3 and the resistance between the point O3 and the point B, and affected by the other intersections (the points O1, O2, O4). Similarly, the resistance R_BC is determined by the resistance between the point B and the point O4 and the resistance between the point O4 and the point C, and affected by the other intersections (the points O1, O2, O3). In this case, the intersections of the rectangular conductive planes MT_X and MT_Y can be properly reduced, so as to reduce computational complexity. For example, depending on materials or related demands, the conductive material can only be coated on one side of contact surfaces of the rectangular conductive planes MT_X and MT_Y related to the point O3, or the insulation material can be coated on one side of contact surfaces of the rectangular conductive planes MT_X and MT_Y unrelated to the point O3, so as to reduce the intersections of the rectangular conductive planes MT_X and MT_Y into only the point O3. As a result, the resistance R_AB is determined by the resistance between the point A and the point O3 and the resistance between the point O3 and the point B, and the resistance R_BC is determined by the resistance between the point B and the point O4 and the resistance between the point O4 and the point C, such that the computational complexity of the conversion unit 802 can be significantly reduced.

On the other hand, in order to reduce the computational complexity, the conversion unit 802 further can utilize a Look-up Table to store relation between different resistance R_AB, R_BC and lengths L[A,B], L[B,C]. Meanwhile, designers can determine the amount of data included in the Look-up Table according to system requirement, for enhancing efficiency.

For example, please refer to FIG. 9A and FIG. 9B, which are schematic diagrams of conversion tables 90, 92 according to an embodiment of the present invention, respectively. The conversion tables can be obtained by measuring the resistance R_AB and R_BC under all kinds of movement condition when horizontal and vertical movable ranges of the positioning axle P_AX are both divided into 10 steps. The conversion table 90 is a corresponding conversion relation between the resistance R_AB and the length L[A,B], and the conversion table 92 is a corresponding conversion relation between the resistance RBC and the length L[B,C]. Both the conversion tables 90 and 92 are stored in the conversion unit 802, for determining the control signal DR_CMD. Noticeably, FIG. 9A and FIG. 9B are utilized for illustrating concepts of the present invention, and the resistance method is merely one exemplary embodiment. Meanwhile, the resistance between the points A, B and the positioning axle P_AX is utilized for summarizing and simplifying cases with different intersections in the conversion tables 90, 92 for convenience. Besides, since the horizontal and vertical movable ranges of the positioning axle P_AX are both divided into 10 steps, a margin of error can be properly set. Take a margin of error of 15% for example, assume that a resistance is p_rst in the conversion table 90 or 92, if the resistance detection unit 800 determines a resistance rx (R_AB or R_BC) meets:

$$p\_rst*(1-15\%) < rx < p\_rst*(1+15\%),$$

the conversion unit 802 can determine the resistance rx is the resistance p_rst.

The conversion tables 90, 92 can be used as follows. After the resistance detection unit 800 detects the resistance R_AB, the conversion unit 802 compares the resistance R_AB to the conversion table 90 according to the aforementioned method, and finds out a corresponding line or point (when the movement of the positioning axle P_AX is equal to double extreme values). Then, the resistance detection unit 800 detects the resistance R_BC, and the conversion unit 802 compares the resistance RBC to the conversion table 92, and finds out corresponding to a corresponding line or point (when the movement of the positioning axle P_AX is equal to double extreme values). Finally, the conversion unit 802 compares the two lines or points to determine the movement of the positioning axle P_AX, and generates the control signal DR_CMD accordingly.

Figure 10B:
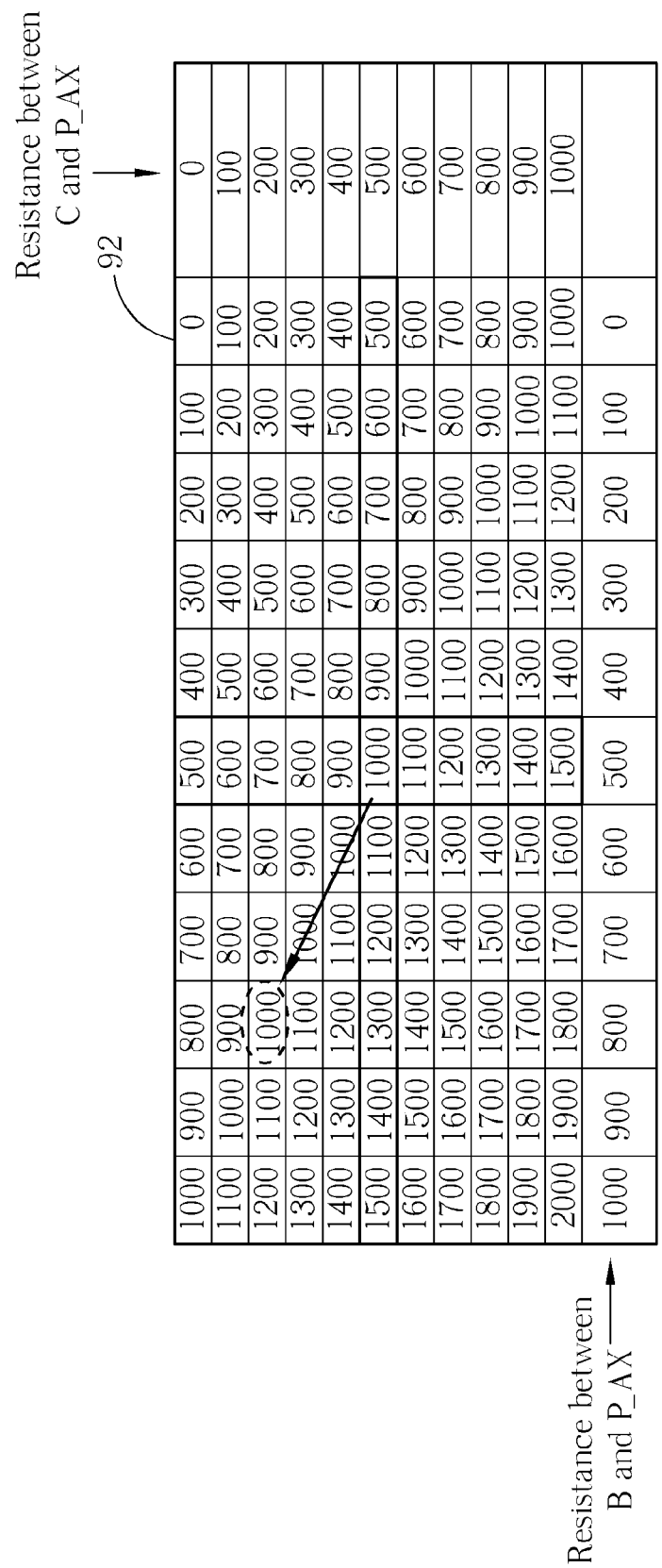

For example, assume that the initial position of the positioning axle P_AX is (6,6), if the resistance detection unit 800 detects the resistance R_AB is 400 ohm and the resistance R_BC is 1000 ohm, the conversion unit 802 determines a line shown in FIG. 10A (dotted region) according to the conversion table 90 first, and then determines (3,3) is a position of the positioning axle P_AX according to the conversion table 92. In other words, the positioning axle P_AX is moved from the initial position (6,6) to (3,3). As a result, the conversion unit 802 can output a corresponding control signal DR_CMD.

Figure 11A:
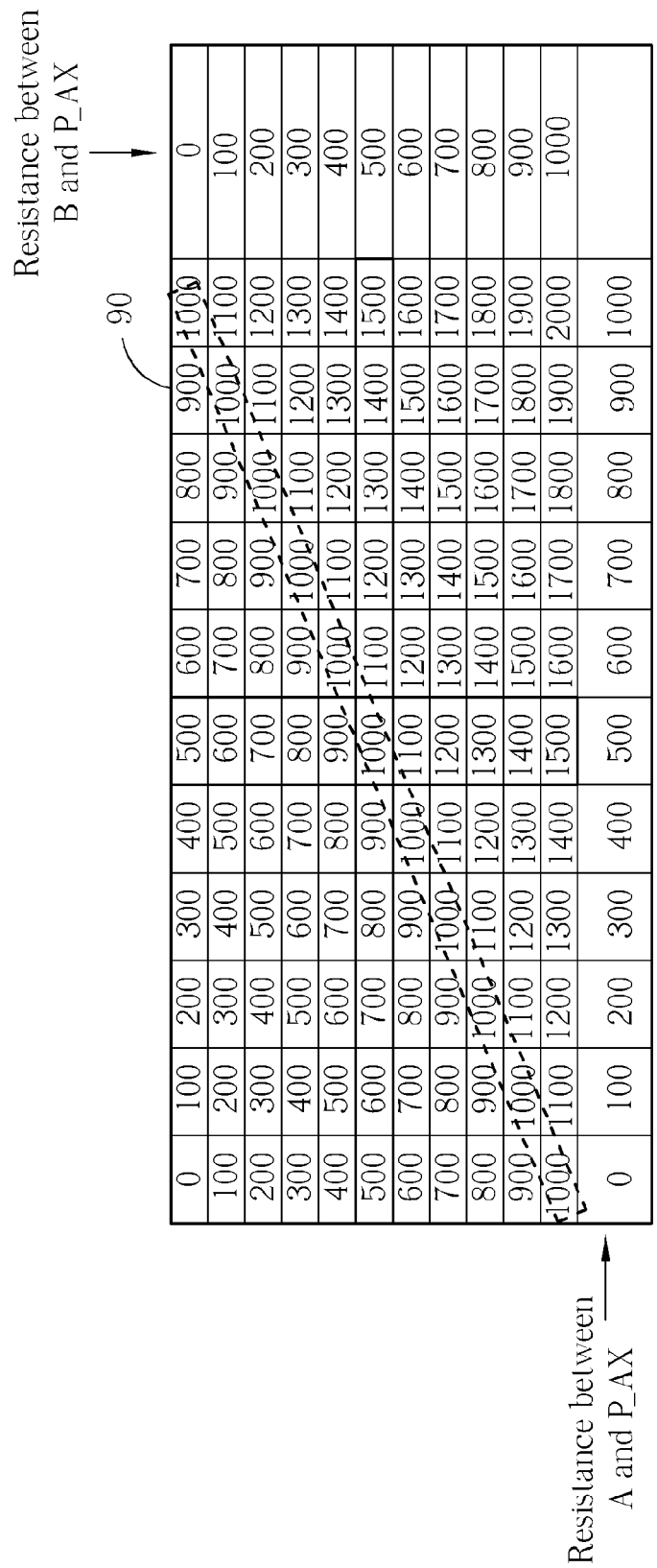

Similarly, if the resistance detection unit 800 detects the resistance R_AB is 1000 ohm, and the resistance RBC is 400 ohm, the conversion unit 802 determines a line shown in FIG. 11A (dotted region) according to the conversion table 90 first, and then determines (9,3) is a position of the positioning axle P_AX according to the conversion table 92. In other words, the positioning axle P_AX is moved from the initial position (6,6) to (9,3). As a result, the conversion unit 802 can output a corresponding control signal DR_CMD.

In addition, the above description uses change of the coordinates to represent possible contents of the control signal DR_CMD. In fact, the meaning of the control signal DR_CMD can be determined according to changing magnitude of the coordinates. For example, a relative mode can be defined. Under the relative mode, direction and velocity of movement of an object controlled by the direction indicating device 20, such as a computer system or a game pointer, are determined according to the difference between the initial position and the position after movement of the positioning axle P_AX. Besides, an absolute mode can be defined as well. Under the absolute mode, each point within the movable range of the positioning axle P_AX is corresponding to the movable range of the object controlled by the direction indicating device 20. However, the content, operation, and format of the control signal DR_CMD can be modified by those skilled in the art according to practical requirement while retaining the spirit of the present invention.

In the prior art, a direction indicating device includes keys or trigger units corresponding to different directions as switches, such that a user control request is not responded accurately. In comparison, the present invention utilizes relation between the length and the resistance of the rectangular conductive planes MT_X, MT_Y to determine the movement of the positioning axle P_AX, such that the user control can be determined accurately. Noticeably, modification according to the concept should belong to the scope of the present invention, and should not be affected by the applied fields. For example, a computer system, a game console, a multimedia device, a household appliance or tool machine can utilize the direction indicating device 20. Besides, the elastic component EL can be an object or an element with elasticity, such as a spring, a pneumatic rubber ring. The lengths of the rectangular conductive planes MT_X, MT_Y are not limited to equal length, and can be unequal length as well, only if the conversion tables 90, 92 are properly adjusted. Besides, the thicknesses of the rectangular conductive planes MT_X, MT_Y are preferably a fixed value, but as long as the resistance or certain electric characteristics is proportional to or with specific relation to the length, the material, shape, even thickness are not limited to any rule. For example, the rectangular conductive planes MT_X, MT_Y can be realized by metal planes with the same thickness or hard-plastic-covered graphite as well. In addition, the housing can be assembled by the hook and the slot, as well as screws.

Besides, the control signal generating module 80 can be directly connected to the points A, B, C through enameled wires, or can be indirectly connected to the points A, B, C through the elastic planes of the rectangular conductive planes MT_X, MT_Y. Furthermore, other connection method capable of reflecting length variation can be utilized other than being connected to the points A, B, C. For example, if the rectangular conductive planes MT_X, MT_Y are electrically connected to the positioning axle P_AXis, the control signal DR_CMD can be generated by measuring the resistance between the point A and the positioning axle P_AX and the resistance between the positioning axle P_AX and the point B, and properly converting the resistances. In this case, the connection and realization of the control signal generating module 80 should be modified accordingly. Those skilled in the art can easily complete such modification by referring to the above description.

Figure 12:
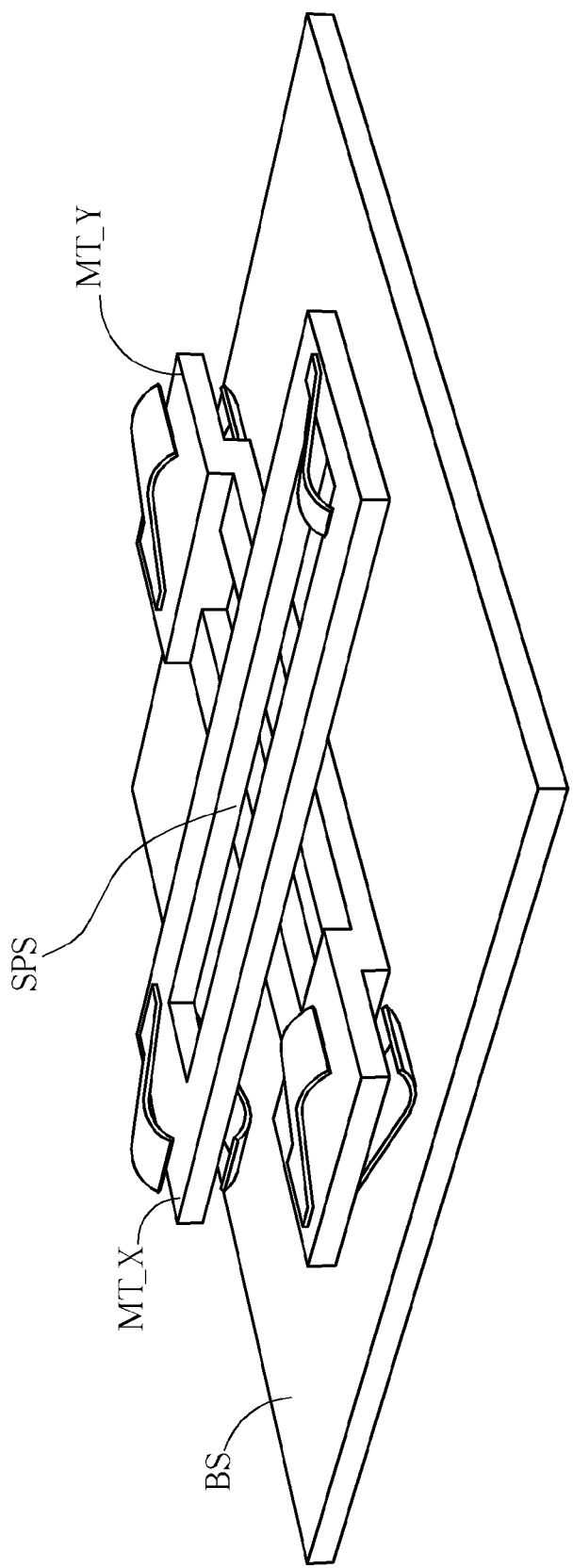
FIG. 12 is a schematic diagram of alteration of the rectangular conductive planes of the direction indicating device shown in FIG. 2A and FIG. 2C.

In the direction indicating device 20, the elastic planes underneath the rectangular conductive planes MT_X, MT_Y are utilized for keeping a distance from the base board BS. In fact, the elastic planes can be added above the rectangular conductive planes MT_X, MT_Y, as shown in FIG. 12, for keeping a fixed distance or pressure from upper cap CS_UP, so as to enhance assembly quality.

Figure 13A:
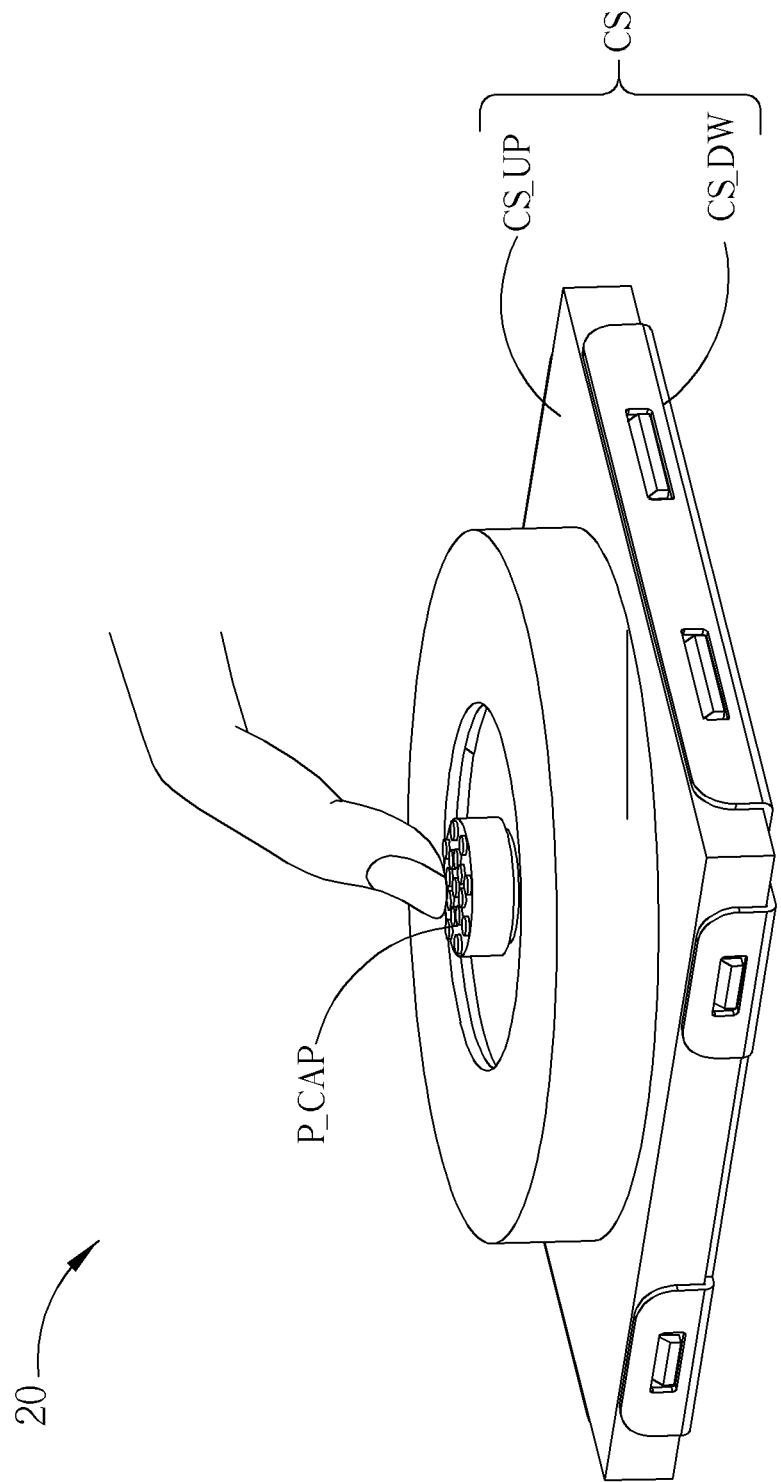
FIG. 13A is a schematic diagram of an operation of the direction indicating device shown in FIG. 2A and FIG. 2C.
Figure 13B:
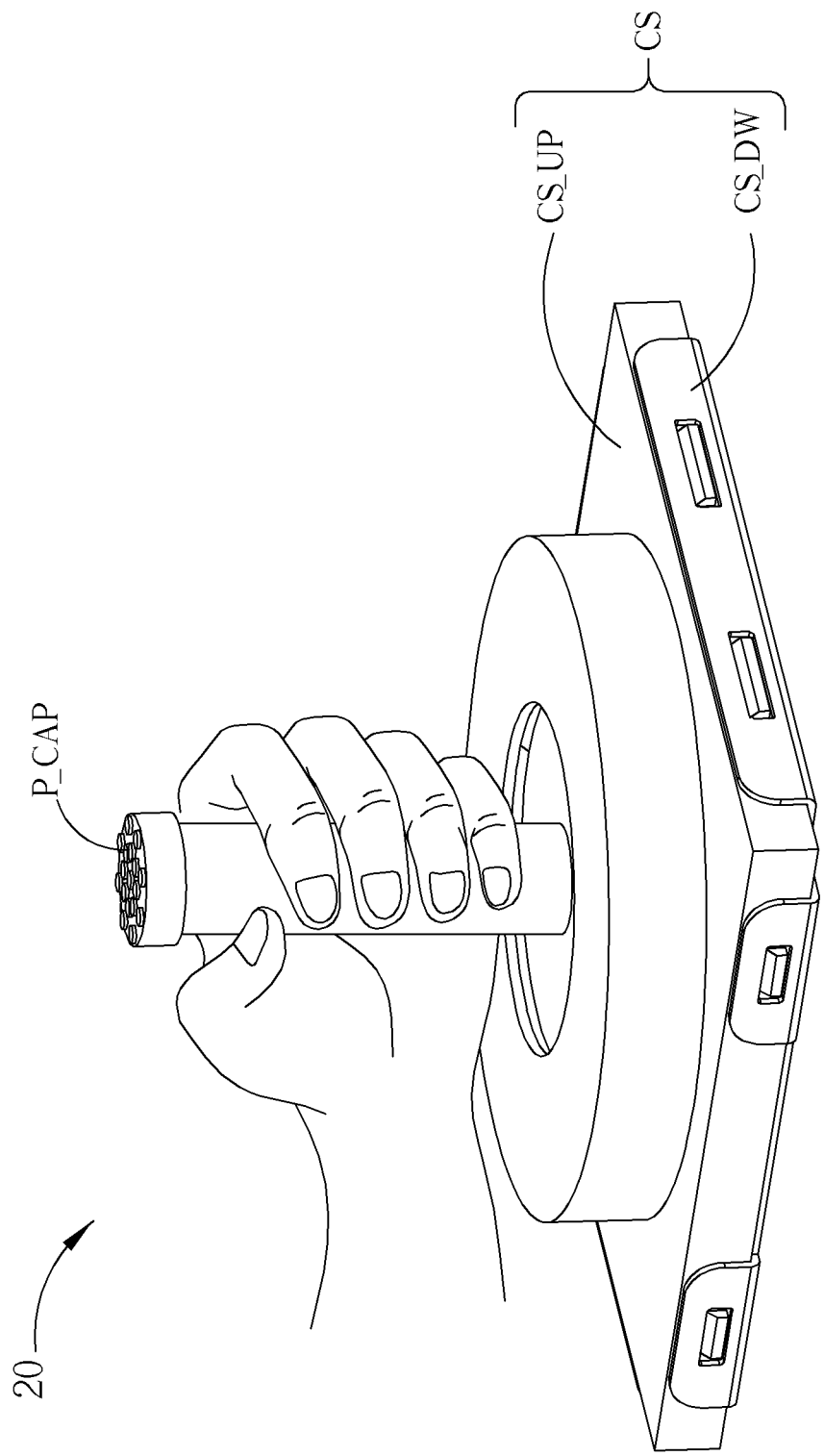
FIG. 13B is a schematic diagram of another operation of the direction indicating device shown in FIG. 2A and FIG. 2C.

On the other hand, in the all above examples, the positioning axle upper cap P_CAP acts as a contact point for operation. However, in practical application, a designer can properly adjust the size or the exterior of the direction indicating device 20 according to application. For example, for application in a computer system, the size of the direction indicating device 20 can be properly designed such that a user can operate with one finger, as shown in FIG. 13A. For application in a joystick, the positioning axle P_AX can be extended, such that a user can operates with one hand, as shown in FIG. 13B.

Besides, the direction indicating device 20 can be upside down. The positioning axle upper cap P_CAP can be fixed on a plate, such that the user can operate by moving the dock CS_DW of the direction indicating device 20. Otherwise, the positioning axle upper cap P_CAP is not fixed on the plate, but the upper cap CS_UP is fixed on the plate instead, while the positioning axle P_AX protrudes out of the dock CS_DW for operation.

As for the interior of the direction indicating device 20, the positioning axle P_AX is maintained to be perpendicular to the base board BS. In order to enhance convenience, a horizontal fixing component can be added between the base board BS and the positioning axle P_AX for fixing the horizontal position of the positioning axle P_AX. The horizontal fixing component can be an element with rolling balls. Meanwhile, an elastic component can further be added between the ring fixing component FX and the positioning axle P_AX, so as to force the positioning axle P_AX downward, such that the horizontal fixing component can touch the base board BS. Otherwise, a hole with proper size can be added on the base board BS, and the horizontal fixing component is disposed under the hole. The positioning axle P_AX passes through the hole, and is connected to the horizontal fixing component. At this moment, the elastic component added between the ring fixing component FX and the positioning axle P_Ax is utilized for lifting the positioning axle P_AX, such that the horizontal fixing component can touch the base board BS. Of course, the added horizontal fixing component can be utilized when the direction indicating device 20 is upside down. In relative to the rectangular conductive plane MT_X or MT_Y, the horizontal fixing component and a force bearer part of the positioning axle P_AX can be on the same side (the positioning axle P_AX protruding out of the base board acts as a control contact surface when the direction indicating device 20 is upside down), or on different sides (the base board acts as the control contact surface when the direction indicating device 20 is under normal operation, or upside down, and the positioning axle upper cap P_CAP is fixed on the plate).

The positioning axle P_AX moves perpendicularly in comparison with the base board BS, and can move in other ways by fixing the axis to one point in the base board BS. For example, a center fixing component can be added between the positioning axle P_AX and the base board BS, e.g. an elastic ring, such that the positioning axle P_AX can swing freely without separating from the base board BS. In this case, if the ring fixing component FX is inelastic, the rectangular conductive planes MT_X, MT_Y maybe pressed when the positioning axle P_AX moves. Therefore, an elastic component can be added between the ring fixing component FX and the positioning axle P_AX, such that the rectangular conductive planes MT_X, MT_Y can remain stable when the positioning axle P_AX moves. Similarly, the center fixing component can be added when the direction indicating device 20 is upside down. In relative to the rectangular conductive plane MT_X or MT_Y, the center fixing component and the force bearer part of the positioning axle P_AX can be at the same position on the same side (the base board acts as the control contact surface when the direction indicating device 20 is upside down, and the positioning axle upper cap P_CAP is fixed on the plate) OR at different positions on the same side (the positioning axle P_AX protruding out of the base board acts as a control contact surface when the direction indicating device 20 is upside down), or on different sides (when the direction indicating device 20 is under normal operation).

The rectangular conductive planes MT_X, MT_Y can be fixed by the elastic planes or by adding slits on the base board BS, to replace the elastic planes with insertion components, such as iron planes or rollers.

Furthermore, the direction indicating device 20 is utilized for 2D direction control. In fact, the concept can be utilized for 1D direction control or 3D direction control. Those skilled in the art can complete such modification by referring to the above description.

In prior art, the direction indicating device utilizes keys corresponding to different directions or a trigger unit for acting as switches, such that a user control is not responded accurately. By comparison, the present invention measures the resistance between different rectangular conductive planes and utilizes the proportional relation between the length and the resistance of the rectangular conductive planes to determine the movement of the positioning axle, such that the user control is determined accurately. Besides, the conventional key-based direction indicating device is rubbed after long-term use, leading to poor contact and ineffective usage. In contrast, the present invention can effectively enhance durability without such problem.

To sum up, the direction indicating device according to the present invention can accurately respond to user control, and enhance accuracy, durability, as well as reliability.

Those skilled in the art will readily observe that numerous modifications and alterations of the device and method may be made while retaining the teachings of the invention.

What is claimed is:

1. A direction indicating device, for generating a two-dimensional (2D) direction indicating signal in an electronic device, comprising:
   a base board;
   a first rectangular conductive plane, formed on the base board, comprising a first sliding slot;
   a second rectangular conductive plane, formed on the base board, overlapping the first rectangular conductive plane, comprising a second sliding slot;
   a positioning axle, perpendicular to the base board, passing through a space corresponding to overlap portions of the first sliding slot and the second sliding slot, for moving the first rectangular conductive plane along a first direction and moving the second rectangular conductive plane along a second direction when an external force is received; and
   a control signal generating module, for outputting the 2D direction indicating signal according to electric information from an end of the first rectangular conductive plane to an end the second rectangular conductive plane and electric information from the end of the second rectangular conductive plane to another end the first rectangular conductive plane;

wherein the first rectangular conductive place and the second rectangular conductive plane are electrically connected;
wherein the control signal generating module comprises:
a first detection terminal, coupled to one end of the first rectangular conductive plane;
a second detection terminal, coupled to another end of the first rectangular conductive plane;
a third detection terminal, coupled to one end of the second rectangular conductive plane;
a resistance determination unit, coupled to the first detection terminal, the second detection terminal and the third detection terminal, for determining a first resistance between the first detection terminal and the third detection terminal, and a second resistance between the third detection terminal and the second detection terminal; and
a conversion unit, coupled to the resistance determination unit, for generating the 2D direction indicating signal according to the first resistance and the second resistance.

2. The direction indicating device of claim 1 further comprising a housing, for accommodating the base board, the first rectangular conductive plane, the second rectangular conductive plane, the positioning axle and the control signal generating module.

3. The direction indicating device of claim 2, wherein the housing comprises a cavity, for disposing an elastic component for returning the positioning axle to an initial position when the external force is removed.

4. The direction indicating device of claim 3, wherein the elastic component is a spring enclosing the positioning axle.

5. The direction indicating device of claim 3 further comprising a ring fixing component, enclosing the positioning axle, for fixing the elastic component.

6. The direction indicating device of claim 1, wherein the first direction is orthogonal to the second direction.

7. The direction indicating device of claim 1, wherein the resistance determination unit determines the first resistance at a first time, and determines the second resistance at a second time behind the first time.

8. The direction indicating device of claim 1, wherein thicknesses of the first rectangular conductive plane and the second rectangular conductive plane are fixed values.

9. The direction indicating device of claim 1 further comprising:
at least one first elastic plane, formed on one side of the first rectangular conductive plane facing the base board or on one side of the base board facing the first rectangular conductive plane, for keeping a first distance between the first rectangular conductive plane and the base board; and
at least one second elastic plane, formed on one side of the second rectangular conductive plane facing the base board or on one side of the base board facing the second rectangular conductive plane, for keeping a second distance between the second rectangular conductive plane and the base board.

10. The direction indicating device of claim 9, wherein the control signal generating module determines the electric information of the first rectangular conductive plane relative to the second rectangular conductive plane and the electric information of the second rectangular conductive plane relative to the first rectangular conductive plane through the at least one first elastic plane and the at least one second elastic plane.

11. The direction indicating device of claim 1 further comprising:
a center fixing component, for fixing a point in an axis of the positioning axle to a point in a plane corresponding to the base board;
wherein the positioning axle centers around the center fixing component and the positioning axle is not perpendicular to the base board when a force bearer part of the positioning axle receives the external force.

12. The direction indicating device of claim 11, wherein the center fixing component and the force bearer part of the positioning axle are on a same side relative to the first rectangular conductive plane, and a distance between the force bearer part and the first rectangular conductive plane is greater than a distance between the center fixing component and the first rectangular conductive plane.

13. The direction indicating device of claim 11, wherein the center fixing component and the force bearer part of the positioning axle are on different sides relative to the first rectangular conductive plane.

14. The direction indicating device of claim 11, wherein the center fixing component overlaps the force bearer part of the positioning axle, and the external force is transmitted to the force bearer part through the base board and the center fixing component.

15. The direction indicating device of claim 11 further comprising an elastic component, formed between the center fixing component and the base board, for returning the positioning axle to be perpendicular to the base board when the external force is removed.

* * * * *